(12) United States Patent
Xiao

(10) Patent No.: US 10,338,911 B2
(45) Date of Patent: Jul. 2, 2019

(54) METHOD AND DEVICE FOR DOWNLOADING SOFTWARE VERSION, AND STORAGE MEDIUM

(71) Applicant: ZTE Corporation, Shenzhen (CN)

(72) Inventor: Jianhua Xiao, Shenzhen (CN)

(73) Assignee: ZTE Corporation, Shenzhen, Guangdon (CN)

( * ) Notice: Subject to any disclaimer, the term of this patent is extended or adjusted under 35 U.S.C. 154(b) by 0 days.

(21) Appl. No.: 15/568,008

(22) PCT Filed: Jul. 20, 2015

(86) PCT No.: PCT/CN2015/084522
§ 371 (c)(1),
(2) Date: Oct. 20, 2017

(87) PCT Pub. No.: WO2016/173128
PCT Pub. Date: Nov. 3, 2016

(65) Prior Publication Data
US 2018/0136923 A1    May 17, 2018

(30) Foreign Application Priority Data

Apr. 27, 2015   (CN) .......................... 2015 1 0204681

(51) Int. Cl.
| | | |
|---|---|---|
| G06F 8/65 | (2018.01) | |
| H04W 8/22 | (2009.01) | |
| G06F 8/658 | (2018.01) | |

(52) U.S. Cl.
CPC ................ G06F 8/65 (2013.01); G06F 8/658 (2018.02); H04W 8/22 (2013.01)

(58) Field of Classification Search
CPC ............. G06F 8/65; H04L 67/34; H04W 4/08
(Continued)

(56) References Cited

U.S. PATENT DOCUMENTS 7,558,953 B2 *  7/2009  Osthoff .................... G06F 21/51
                                                     713/161
7,564,832 B2 *  7/2009  Van Parys ............. H04W 74/04
                                                     370/350
(Continued)

FOREIGN PATENT DOCUMENTS

| CN | 101539885 A | 9/2009 |
|----|-------------|--------|
| CN | 101984405 A | 3/2011 |

(Continued)

OTHER PUBLICATIONS

Funasaka, "On Control Parameters for Segmented File Download Using PR-SCTP Unordered Delivery", IEEE, The 2014 International Conference on Advanced Technologies for Communications (ATC'14) (Year: 2014).*

(Continued)

*Primary Examiner* — Hossain M Morshed
(74) *Attorney, Agent, or Firm* — Cooper Legal Group, LLC

(57) ABSTRACT

A method and device for downloading a software version and a storage medium, including that: n partitions to be downloaded of a software version to be sent are determined, n≥1 (S101); a mobile terminal is indicated to format a mapping partition corresponding to an mth partition to be downloaded in the n partitions to be downloaded in the mobile terminal, n≥m≥1 (S102); and when it is determined that formatting of the mapping partition corresponding to the mth partition to be downloaded is completed and succeeds, data of the mth partition to be downloaded is packed into an all-0 data packet or a non-0 data packet, and the all-0 data packet or the non-0 data packet is sent (S103).

19 Claims, 13 Drawing Sheets

(58) Field of Classification Search
USPC .......................................................... 717/173
See application file for complete search history.

(56) References Cited

U.S. PATENT DOCUMENTS

| | | | | |
|---|---|---|---|---|
| 7,673,300 | B2* | 3/2010 | Herle ...................... | G06F 8/658 717/169 |
| 7,716,660 | B2* | 5/2010 | Mackay .................. | G06F 8/658 717/173 |
| 2003/0191930 | A1* | 10/2003 | Viljoen ..................... | G06F 8/65 713/1 |
| 2007/0273564 | A1* | 11/2007 | Morel ..................... | G06F 16/80 341/87 |
| 2008/0086631 | A1* | 4/2008 | Chow ..................... | G06F 8/654 713/2 |
| 2013/0125107 | A1* | 5/2013 | Bandakka ........... | G06F 11/1417 717/171 |
| 2015/0020060 | A1 | 1/2015 | Bandakka et al. | |
| 2018/0136923 | A1* | 5/2018 | Xiao ......................... | G06F 8/65 |

FOREIGN PATENT DOCUMENTS

| | | |
|---|---|---|
| CN | 102609304 A | 7/2012 |
| CN | 102799452 A | 11/2012 |
| CN | 103167348 A | 6/2013 |

OTHER PUBLICATIONS

Marler, "WooshCom® Announces Advanced Null Packet Filtering Algorithm", 2013, WooshCom (Year: 2013).*
International Search Report in international application No. PCT/CN2015/084522, dated Jan. 27, 2016, 2 pgs.
English Translation of the Written Opinion of the International Search Authority in international application No. PCT/CN2015/084522, dated Jan. 27, 2016, 5 pgs.
Supplementary European Search Report in European application No. 15890506.7, dated Mar. 27, 2018, 8 pgs.

* cited by examiner

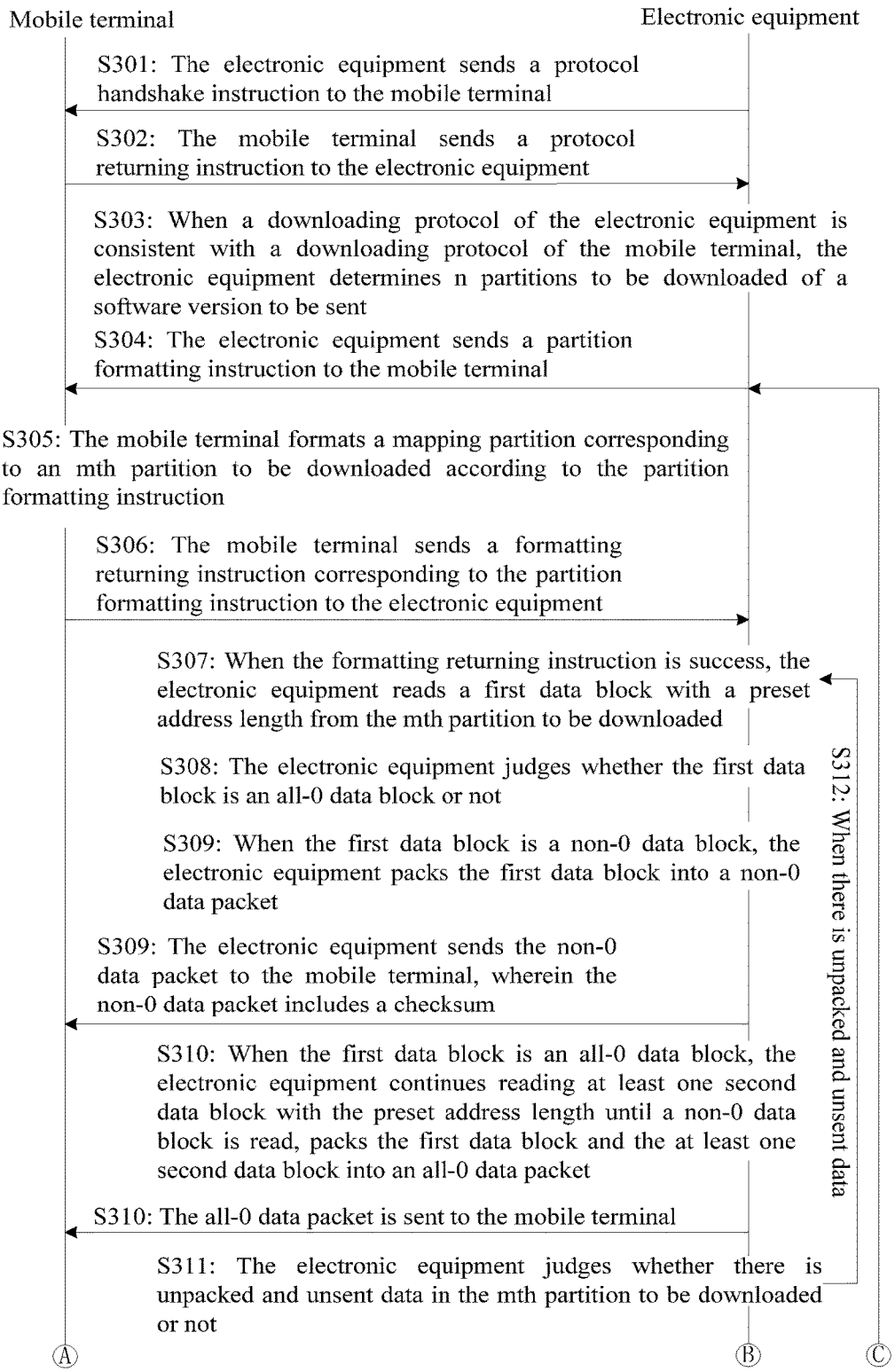
FIG. 3 (1)

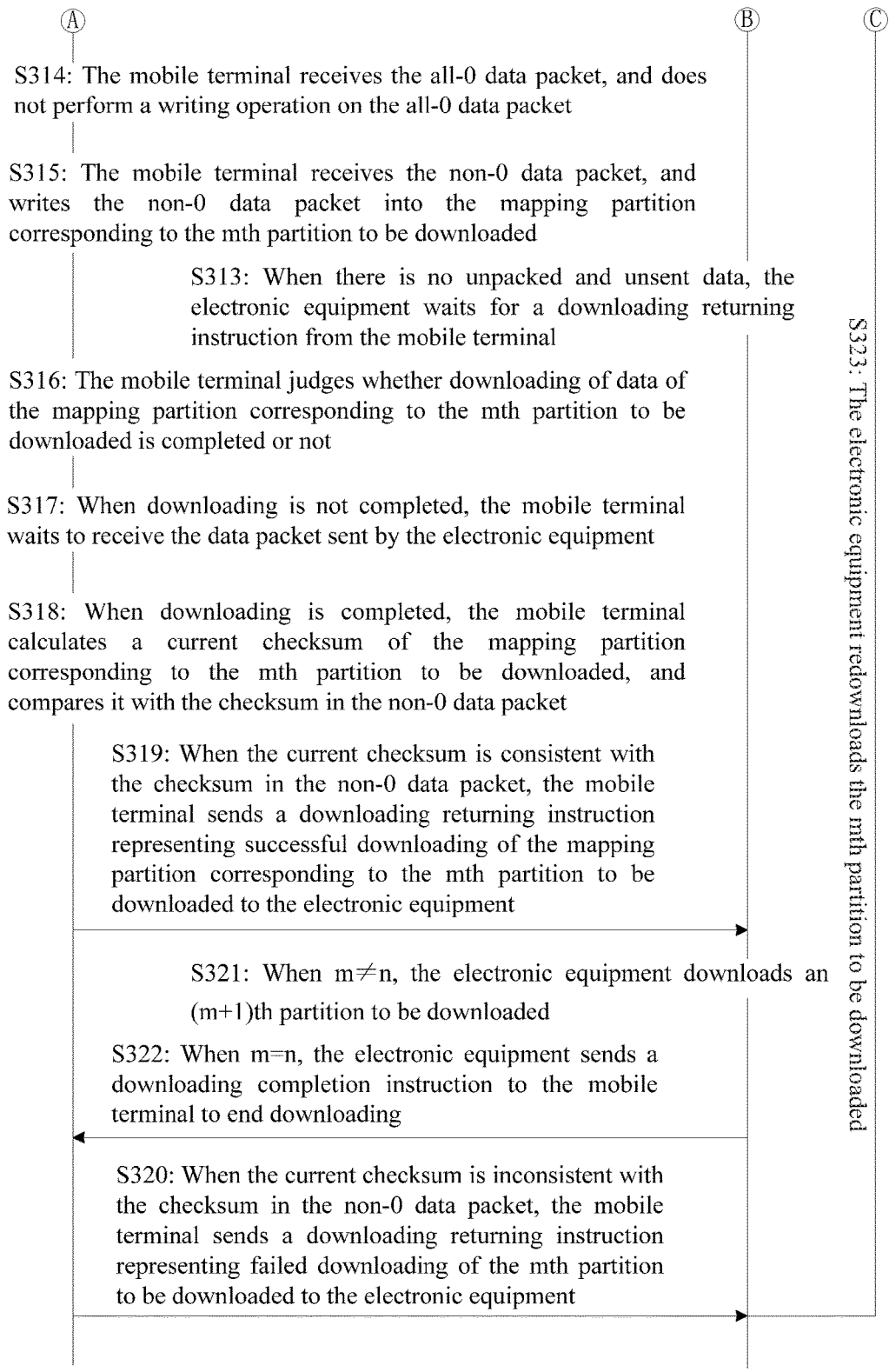
FIG. 3 (2)

METHOD AND DEVICE FOR DOWNLOADING SOFTWARE VERSION, AND STORAGE MEDIUM

TECHNICAL FIELD

The disclosure relates to a software management technology in the field of communications, and particularly to a method and device for downloading a software version and a storage medium.

BACKGROUND

Along with rapid development of the mobile communication industry, a mobile terminal product has more and more multimedia service functions, which makes a software version of a mobile terminal larger and larger and also makes an updating frequency of the software version higher and higher in a production link, a post-sales link and during use by a user.

In a conventional art, a downloading tool in electronic equipment communicates and handshakes with a downloading agent in a mobile terminal through a data line. There is a predetermined downloading protocol between the downloading tool and the downloading agent. The electronic equipment downloads a software version to the mobile terminal according to the predetermined downloading protocol. Specifically, the downloading tool in the electronic equipment reads information about the software version, and sends the information about the software version to the mobile terminal in form of a data packet. The downloading agent in the mobile terminal parses the data packet, writes it into an internal storage area of the mobile terminal, and sends feedback information to the downloading tool after successful writing.

However, when the solution of the conventional art is adopted to implement downloading of a software version, a downloading time length forms a directly proportional relationship with a file size of the software version. For example, a writing speed of an internal storage area of a mobile phone is about 10 MB/second, a size of a mobile phone software version of an intelligent mobile phone may reach 2 GB and even more, and thus only writing the software version into a storage space spends more than 200 seconds. If overhead in transmission, checking and the like of a data packet between a computer and the intelligent mobile phone is further considered, the whole downloading time of the software version is more than 400 seconds. Therefore, in a frequent downloading and upgrading process of a software version, for a current large software version, if a conventional downloading manner is adopted, a downloading time of the software version may be excessively long, and a downloading rate is low.

SUMMARY

In order to solve the above technical problem(s), embodiments of the disclosure are intended to provide a method and device for downloading a software version and a storage medium.

The technical solutions of the disclosure are implemented as follows.

The embodiments of the disclosure provide a method for downloading a software version, which includes that:

n partitions to be downloaded of a software version to be sent are determined, $n \geq 1$;

a mobile terminal is indicated to format a mapping partition corresponding to an mth partition to be downloaded in the n partitions to be downloaded in the mobile terminal, $n \geq m \geq 1$; and when it is determined that formatting of the mapping partition corresponding to the mth partition to be downloaded is completed and succeeds, data of the mth partition to be downloaded is packed into an all-0 data packet or a non-0 data packet, and the all-0 data packet or the non-0 data packet is sent.

In the solution, the step that the data of the mth partition to be downloaded is packed into the all-0 data packet or the non-0 data packet and the all-0 data packet or the non-0 data packet is sent may include that:

A1: a first data block with a preset address length is read from the mth partition to be downloaded;

A2: it is judged whether the first data block is an all-0 data block or not;

A3: when the first data block is a non-0 data block, the first data block is packed into a non-0 data packet, and the non-0 data packet is sent; and when the first data block is an all-0 data block, at least one second data block with the preset address length is continued to be read until a non-0 data block is read, the first data block and the at least one second data block are packed into an all-0 data packet, and the all-0 data packet is sent.

In the solution, after the operation that the all-0 data packet or the non-0 data packet is sent, the method may further include that:

it is judged whether there is unpacked and unsent data in the mth partition to be downloaded or not;

when there is unpacked and unsent data, A1 to A3 are re-executed; and when there is no unpacked and unsent data, a downloading returning instruction from the mobile terminal is waited for, the downloading returning instruction being configured to indicate a downloading state of data of the mapping partition corresponding to the mth partition to be downloaded.

In the solution, the downloading state may include: successful downloading or failed downloading;

after the step that the downloading returning instruction from the mobile terminal is waited for when there is no unpacked and unsent data, the method may farther include that:

the downloading returning instruction is received;

when the downloading returning instruction indicates that the downloading state is successful downloading and m<n, an (m+1)th partition to be downloaded is downloaded; and when the downloading returning instruction indicates that the downloading state is failed downloading, the mth partition to be downloaded is re-downloaded.

In the solution, after the operation that the downloading returning instruction sent by the mobile terminal is received, when m=n, the method may further include that:

a downloading completion instruction is sent to end downloading, the downloading completion instruction being configured to indicate that software version downloading of the mobile terminal is completed.

In the solution, the step that the mobile terminal is indicated to format the mapping partition corresponding to the mth partition to be downloaded in the n partitions to be downloaded in the mobile terminal may include that:

a partition formatting instruction is sent, the partition formatting instruction being configured to indicate the mobile terminal to format the mapping partition corresponding to the mth partition to be downloaded in the n partitions to be downloaded in the mobile terminal; and a formatting returning instruction corresponding to the partition formatting instruction is received, the formatting returning instruction being configured to indicate whether the mobile terminal completes formatting of the mapping partition corresponding to the mth partition to be downloaded or not.

The embodiments of the disclosure further provide a storage medium including a set of instructions, the instructions being executed to cause at least one processor to execute the operations of the abovementioned method.

The embodiments of the disclosure further provide a method for downloading a software version, which includes that:

a formatting indication is received, and a mapping partition corresponding to an mth partition to be downloaded in a software version to be sent by electronic equipment in a mobile terminal is formatted according to the indication; the software version to be sent including n partitions to be downloaded, n≥m≥1; and when formatting of the mapping partition corresponding to the mth partition to be downloaded is completed and succeeds, an all-0 data packet is received and a writing operation is not performed on the all-0 data packet, or a non-0 data packet is received and the non-0 data packet is written into the mapping partition corresponding to the mth partition to be downloaded.

In the solution, the indication may be a partition formatting instruction; and after the step that the mapping partition corresponding to the mth partition to be downloaded is formatted, the method may further include that:

a formatting returning instruction corresponding to the partition formatting instruction is sent, the formatting returning instruction being configured to indicate whether formatting of the mapping partition corresponding to the mth partition to be downloaded is completed or not.

In the solution, the non-0 data packet may include: a checksum;

after the step that the non-0 data packet is received and the writing operation is performed on the non-0 data packet in the mapping partition corresponding to the mth partition to be downloaded, the method may further include that:

it is judged whether downloading of data of the mapping partition corresponding to the mth partition to be downloaded is completed or not;

when downloading is completed, a current checksum of the mapping partition corresponding to the mth partition to be downloaded is calculated, and is compared with the checksum in the non-0 data packet; and when downloading is not completed, the data packet is waited to be received.

In the solution, after the step that the current checksum of the mapping partition corresponding to the mth partition to be downloaded is calculated, and is compared with the checksum in the non-0 data packet, the method may further include that:

when the current checksum is consistent with the checksum in the non-0 data packet, a downloading returning instruction representing successful downloading of the mapping partition corresponding to the With partition to be downloaded is sent; and when the current checksum is inconsistent with the checksum in the non-0 data packet, a downloading returning instruction representing failed downloading of the mth partition to be downloaded is sent.

The embodiments of the disclosure further provide a storage medium including a set of instructions, the instructions being executed to cause at least one processor to execute the operations of the abovementioned method.

The embodiments of the disclosure further provide a device for downloading a software version, which includes:

a determination unit, configured to determine n partitions to be downloaded of a software version to be sent, n≥1;

an indication unit, configured to indicate a mobile terminal to format a mapping partition corresponding to an mth partition to be downloaded in the n partitions to be downloaded determined by the determination unit in the mobile terminal, n≥m≥1;

a packing unit, configured to, when the determination unit determines that formatting of the mapping partition corresponding to the mth partition to be downloaded is completed and succeeds, pack data of the mth partition to be downloaded determined by the determination unit into an all-0 data packet or a non-0 data packet; and a first sending unit, configured to send the all-0 data packet or non-0 data packet packed by the packing unit.

In the solution, the device may further include: a first receiving unit;

the first sending unit may further be configured to send a partition formatting instruction, the partition formatting instruction being configured to indicate the mobile terminal to format the mapping partition, in the mobile terminal, corresponding to the mth partition to be downloaded in the n partitions to be downloaded determined by the determination unit; and the first receiving unit may be configured to receive a formatting returning instruction corresponding to the partition formatting instruction sent by the first sending unit, the formatting returning instruction being configured to indicate whether the mobile terminal completes formatting of the mapping partition corresponding to the filth partition to be downloaded or not.

In the solution, the device may further include: a first judgment unit and a first waiting unit;

the first judgment unit may be configured to, after the first sending unit sends the all-0 data packet or the non-0 data packet, judge whether there is unpacked and unsent data in the mth partition to be downloaded determined by the determination unit or not; and the first waiting unit may be configured to, when the first judgment unit judges that there is no unpacked and unsent data, wait for a downloading returning instruction from the mobile terminal, the downloading returning instruction being configured to indicate a downloading state of data of the mapping partition corresponding to the mth partition to be downloaded.

In the solution, the device may further include: a reading unit;

the reading unit may be configured to, when the determination unit determines that formatting of the mapping partition corresponding to the milt partition to be downloaded is completed and succeeds, read a first data block with a preset address length from the mth partition to be downloaded determined by the determination unit, or, when the first judgment unit judges that there is the unpacked and unsent data, read the first data block with the preset address length from the mth partition to be downloaded determined by the determination unit;

the first judgment unit may further be configured to judge whether the first data block read by the reading unit is an all-0 data block or not;

the packing unit may specifically be configured to, when the first judgment unit judges that the first data block is a non-0 data block, pack the first data block read by the reading unit into a non-0 data packet;

the first sending unit may specifically be configured to send the non-0 data packet packed by the packing unit;

the reading unit may further be configured to, when the first judgment unit judges that the first data block is an all-0 data block, continue reading at least one second data block with the preset address length until a non-0 data block is read; the packing unit may further be configured to pack the first data block and the at least one second data block read by the reading unit into an all-0 data packet; and the first sending unit may further be configured to send the all-0 data packet packed by the packing unit.

In the solution, the downloading state may include: successful downloading or failed downloading;

the first receiving unit may further be configured to, when the first judgment unit judges that there is no unpacked and unsent data, after the first waiting unit waits for the downloading returning instruction from the mobile terminal, receive the downloading returning instruction;

the first sending unit may further be configured to, when the downloading returning instruction received by the first receiving unit indicates that the downloading state is successful downloading and m n, send a next partition formatting instruction, the next partition formatting instruction being configured to indicate the mobile terminal to format a mapping partition corresponding to an (m+1)th partition to be downloaded in the mobile terminal; and the first sending unit may further be configured to, when the downloading returning instruction received by the first receiving unit indicates that the downloading state is failed downloading, resend the partition formatting instruction.

In the solution, when m=n, the first sending unit may further be configured to, after the first receiving unit receives the downloading returning instruction, send a downloading completion instruction to end downloading, the downloading completion instruction being configured to indicate that software version downloading of the mobile terminal is completed.

The embodiments of the disclosure further provide a device for downloading a software version, which includes:
a second receiving unit, configured to receive a formatting indication;
a formatting unit, configured to format a mapping partition corresponding to an mth partition to be downloaded of a software version to be sent by electronic equipment in a mobile terminal according to the indication received by the second receiving unit, the software version to be sent including n partitions to be downloaded, n≥m≥1;
the second receiving unit being further configured to, when formatting of the mapping partition corresponding to the mth partition to be downloaded by the formatting unit is completed and succeeds, receive an all-0 data packet or a non-0 data packet; and
a writing unit, configured to not perform a writing operation on the all-0 data packet received by the second receiving unit, or write the non-0 data packet received by the second receiving unit into the mapping partition corresponding to the mth partition to be downloaded.

In the solution, the device may further include: a second sending unit; the indication may be a partition formatting instruction; and
the second sending unit may be configured to, after the formatting unit formats the mapping partition corresponding to the mth partition to be downloaded, send a formatting returning instruction corresponding to the partition formatting instruction received by the second receiving unit, the formatting returning instruction being configured to indicate whether formatting of the mapping partition corresponding to the mth partition to be downloaded is completed or not.

In the solution, the non-0 data packet received by the second receiving unit may include: a checksum; the device may further include: a second judgment unit, a calculation unit, a comparison unit and a second waiting unit;
the second judgment unit may be configured to, after the second receiving unit receives the non-0 data packet and the writing unit writes the non-0 data packet into the mapping partition corresponding to the mth partition to be downloaded, judge whether downloading of data of the mapping partition corresponding to the mth partition to be downloaded is completed or not;
the calculation unit may be configured to, when the second judgment unit judges that downloading is completed, calculate a current checksum of the mapping partition corresponding to the mth partition to be downloaded; the comparison unit may be configured to compare the current checksum calculated by the calculation unit with the checksum in the non-0 data packet received by the second receiving unit; and
the second waiting unit may be configured to, when the second judgment unit judges that downloading is not completed, wait to receive data packet.

In the solution, the second sending unit may further be configured to, after the calculation unit calculates the current checksum of the mapping partition corresponding to the mth partition to be downloaded and the comparison unit compares it with the checksum in the non-0 data packet, when the current checksum calculated by the calculation unit is consistent with the checksum in the non-0 data packet received by the second receiving unit, send a downloading returning instruction representing successful downloading of the mapping partition corresponding to the mth partition to be downloaded, and when the current checksum calculated by the calculation unit is inconsistent with the checksum in the non-0 data packet received by the second receiving unit, send a downloading returning instruction representing failed downloading of the mth partition to be downloaded.

The embodiments of the disclosure provide the method and device for downloading the software version and the storage medium. The electronic equipment determines the n partitions to be downloaded of the software version to be sent at first, n≥1; then, the mobile terminal is indicated to format the mapping partition corresponding to the mth partition to be downloaded in the n partitions to be downloaded in the mobile terminal, n≥m≥1; and when it is determined that formatting of the mapping partition corresponding to the mth partition to be downloaded is completed and succeeds, the data of the mth partition to be downloaded is packed into the all-0 data packet or the non-0 data packet, and the all-0 data packet or the non-0 data packet is sent. By the technical solutions of the embodiments of the disclosure, on one hand, the electronic equipment may send the data in the partitions to be downloaded of the software version to the mobile terminal in form of all-0 data packets or non-0 data packets, and then the mobile terminal may perform the writing operation on the non-0 data packets only, so that a writing operation time in a software version downloading process is reduced. On the other hand, the electronic equipment packs data blocks in the partitions to be downloaded for sending, so that the number of data interactions between the electronic equipment and the mobile terminal is reduced, and an interaction speed of them is increased, it can be seen that the electronic equipment enables the mobile terminal to reduce the writing operation time and data interaction speed in the software version downloading process to further increase a downloading rate of the software version.

BRIEF DESCRIPTION OF DRAWINGS

In the drawings (which are not always drawn to scale), similar reference signs may describe similar parts in different views. Similar reference signs with different letter suffixes may represent different examples of similar parts. The drawings mainly show each embodiment discussed in the disclosure in an exemplary but non-limited manner.

FIG. 3 is an interaction diagram of a method for downloading a software version according to an embodiment of the disclosure.

DETAILED DESCRIPTION

The technical solutions in the embodiments of the disclosure will be clearly and completely described below in combination with the drawings in the embodiments of the disclosure.

It is noted that a method for downloading a software version provided by the embodiments of the disclosure is implemented in a device for downloading a software version. The device for downloading a software version may be integrated into a separate device connected with electronic equipment and a mobile terminal respectively, and may also be arranged in the electronic equipment or the mobile terminal. A specific implementation manner will not be limited in the disclosure.

Embodiment 1

Figure 1:
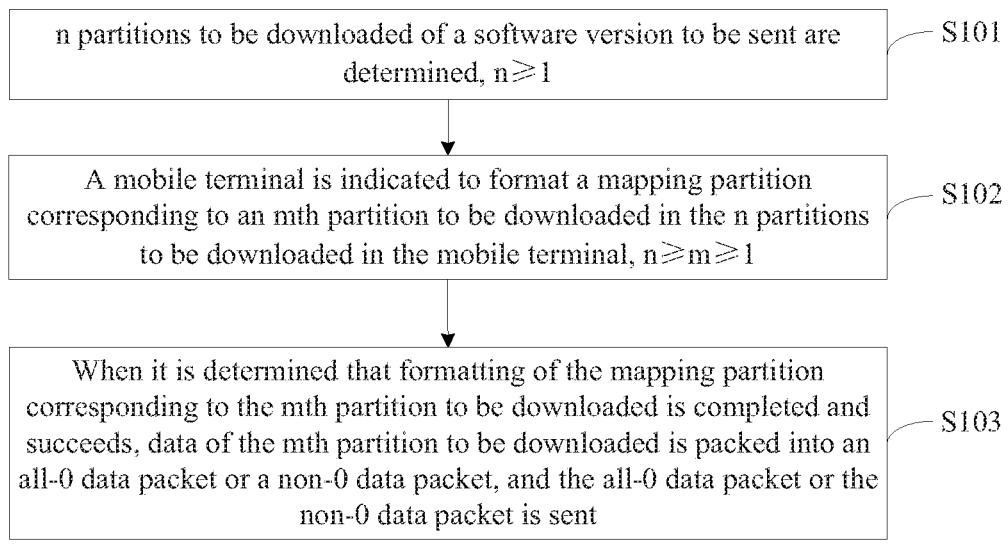
FIG. 1 is a flowchart of a method for downloading a software version according to an embodiment of the disclosure.

An embodiment of the disclosure provides a method for downloading a software version, which is described with arrangement of a device for downloading a software version in electronic equipment and a mobile terminal as an example. FIG. 1 shows a method for downloading a software version at an electronic equipment side, and the method may include the following steps.

In S101, n partitions to be downloaded of a software version to be sent are determined, $n \geq 1$.

In the embodiment of the disclosure, the electronic equipment is connected with the mobile terminal through a data line, and the software version is stored in the electronic equipment.

It is noted that the software version in the embodiment of the disclosure provides software of an operating system of a latest version for the mobile terminal, and the mobile terminal may download and install the new software version to upgrade its own operating system.

Herein, the software version includes multiple disk partitions, and the disk partitions store data related to the operating system. The data is stored in a byte form, 1-byte data is stored at each address in the disk partitions, and there may usually be tens of to more than thirty disk partitions in a software version, for example: a boot partition and a system partition.

Optionally, the software version may be Android 5.0, IOS7 and the like.

Downloading of the software version between the electronic equipment and the mobile terminal is downloading of each partition.

It is noted that there also are all-0 partitions without data, besides non-0 partitions such as the boot partition and the system partition, in the software version. The mobile terminal is not required to download these all-0 partitions and instead the mobile terminal is only required to create these all-0 partitions in the mobile terminal according to a preset partition table file provided by the software version after a mobile phone completes downloading of the non-0 partitions and is restarted.

Specifically, the electronic equipment may determine the n partitions to be downloaded in the software version to be sent according to the partition table file in the software version, and the n partitions to be downloaded are non-0 partitions, $n \geq 1$ that is, data in the n partitions to be downloaded is required to be sent into the mobile terminal by the electronic equipment, and the partition table file includes information representing whether a partition is an all-0 partition or not.

In an embodiment, before the electronic equipment determines the n partitions to be downloaded of the software version to be sent, the electronic equipment is required to confirm a downloading protocol with the mobile terminal to judge whether both the electronic equipment and the mobile terminal use the same downloading protocol or not. The electronic equipment and the mobile terminal may communicate with each other only when they use the same downloading protocol.

Optionally, a common downloading protocol may be: a Hyper Text Transfer Protocol (HTTP), a File Transfer Protocol (FTP) and the like.

Specifically, the electronic equipment sends a protocol handshake instruction to the mobile terminal, the protocol handshake instruction including a downloading protocol used by the electronic equipment. The electronic equipment receives a protocol returning instruction sent by the mobile terminal, the protocol returning instruction including a downloading protocol used by the mobile terminal, and if the downloading protocols of both of them are consistent, the electronic equipment is prepared for downloading, and the electronic equipment starts determining the partitions to be downloaded.

It is noted that a tool for managing downloading of the software version in the electronic equipment is a downloading tool, and downloading of the software version between the electronic equipment and the mobile terminal is specifically controlled by a downloading program in the downloading tool.

Optionally, the electronic equipment in the embodiment of the disclosure may be electronic equipment configured to research and develop a new software version, such as a computer.

In S102, the mobile terminal is indicated to format a mapping partition corresponding to an mth partition to be downloaded in the n partitions to be downloaded in the mobile terminal, $n \geq m \geq 1$.

After the electronic equipment determines the n partitions to be downloaded of the software version to be sent, the electronic equipment makes preparations for downloading work. Specifically, the electronic equipment sends a partition formatting instruction to the mobile terminal, the partition formatting instruction being configured to indicate the mobile terminal to format the mapping partition corresponding to the mth partition to be downloaded in the n partitions to be downloaded in the mobile terminal, $n \geq m \geq 1$.

It is noted that, before the mobile terminal starts downloading, there exist mapping partitions corresponding to the n partitions to be downloaded in an original software version of the mobile terminal. Therefore, the electronic equipment downloads data in the n partitions to be downloaded in the new software version into the mapping partitions corresponding to the n partitions to be downloaded in the mobile terminal to update data of the mapping partitions of the n partitions to be downloaded.

Particularly, there is at least one partition to be downloaded of the software version, the mobile terminal sequentially downloads each partition to be downloaded, and during downloading, the mobile terminal is required to format the mapping partition of each partition to be downloaded and then starts receiving the data, so that the partition formatting instruction indicates different partitions to be formatted according to different partitions to be downloaded. In addition, an order of the partitions to be downloaded may be determined by the partition table file, data transmission may also be performed according to a preset order, and a specific data transmission order for the partitions to be downloaded may be determined by a practical setting, and will not be limited in the disclosure.

Exemplarily, the electronic equipment determines 3 partitions to be downloaded, i.e., a boot partition, a system partition and a user partition. m=1, the electronic equipment may cause the mobile terminal to download a mapping partition of the boot partition at first according to the preset partition table file of the software version, and then the electronic equipment sends a partition formatting instruction at first to indicate the mobile terminal to format the mapping partition of the boot partition. The mobile terminal may download a mapping partition of the system partition after completing downloading of the mapping partition of the boot partition, and at this moment, m=2, the electronic equipment resends a partition formatting instruction to indicate the mobile terminal to format the mapping partition of the system partition. In an embodiment, after the electronic equipment sends the partition formatting instruction to the mobile terminal, the electronic equipment receives a formatting returning instruction corresponding to the partition formatting instruction from the mobile terminal, the formatting returning instruction being a formatting completion instruction returned by the mobile terminal after the corresponding mapping partition is formatted according to the partition formatting instruction.

Optionally, the formatting returning instruction may include two types, i.e. success and failure. When the formatting returning instruction is success, it is represented that formatting in the mobile terminal is successfully completed. When the formatting returning instruction is failure, it is represented that formatting in the mobile terminal is not successfully completed.

In S103, when it is determined that formatting of the mapping partition corresponding to the mth partition to be downloaded is completed and succeeds, data of the mth partition to be downloaded is packed into an all-0 data packet or a non-0 data packet, and the all-0 data packet or the non-0 data packet is sent.

Specifically, after the electronic equipment indicates the mobile terminal to format the mapping partition corresponding to the mth partition to be downloaded in the n partitions to be downloaded in the mobile terminal and the formatting returning instruction is success, the electronic equipment performs a reading operation on the data of the mth partition to be downloaded, reads the data of the mth partition to be downloaded, determines the all-0 data packet or non-0 data packet to be sent according to a result of the reading operation, and sends the all-0 data packet or the non-0 data packet to the mobile terminal.

It is noted that, when the device for downloading a software version is not arranged in the mobile terminal, the electronic equipment may send the all-0 data packet or the non-0 data packet to the mobile terminal through the device for downloading a software version connected with the mobile terminal.

Those skilled in the art should know that data in the partitions to be downloaded of the software version may include massive all-0 data capable of forming an all-0 data region. In the embodiment of the disclosure, the electronic equipment may determine the all-0 data in the partitions to be downloaded and further determine the all-0 data region through the reading operation. The electronic equipment determines the all-0 data or non-all-0 data of the partitions to be downloaded, and packs it into an all-0 data packet or a non-all-0 data packet.

In an embodiment, when the formatting returning instruction is failure, S102 is re-executed to re-indicate the mobile terminal to format the mapping partition of the partition to be downloaded which is failed to be formatted until it is successfully formatted.

It is noted that a specific method for determining the data packet by the electronic equipment will be described in a subsequent embodiment in detail, and will not be described herein.

Particularly, the method for downloading a software version provided by the embodiment of the disclosure is a process where the downloading tool in the electronic equipment sends the corresponding data in the software version to a downloading agent in the mobile terminal to enable the mobile terminal to download the software version. After determining a data packet of a partition to be downloaded, the electronic equipment sends the data packet to the mobile terminal.

It can be understood that the electronic equipment indicates the mobile terminal to format the mapping partition of a partition to be downloaded with data the mobile terminal is prepared to download, and during downloading of the data of the partition to be downloaded between the electronic equipment and the mobile terminal, the electronic equipment sends a packed all-0 data packet or non-0 data packet to the mobile terminal to enable the mobile terminal to only write the non-0 data packet and not process the all-0 data packet according to the data packet sent by the electronic equipment. The electronic equipment packs the data for sending, so that the number of data interactions is reduced, time for a data writing operation of the mobile terminal is reduced, and a downloading rate of the software version is further increased.

In an embodiment, after downloading of the mth partition to be downloaded is completed, the electronic equipment and the mobile terminal start data downloading of an (m+1) th partition to be downloaded, that is, S102-S103 are executed until downloading of an nth partition to be downloaded is completed.

Figure 2:
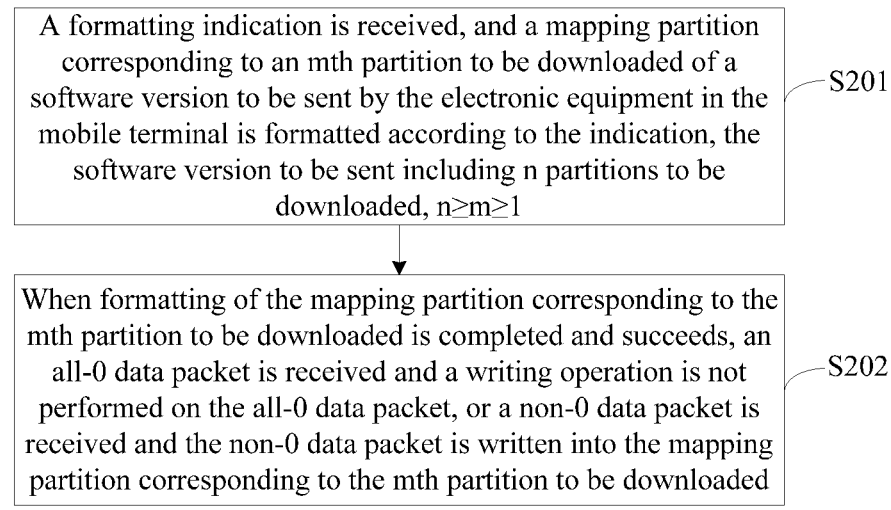
FIG. 2 is a flowchart of another method for downloading a software version according to an embodiment of the disclosure.

The embodiment of the disclosure further provides a method for downloading a software version, which is described with arrangement of a device for downloading a software version in electronic equipment and a mobile terminal as an example. FIG. 2 shows a method for downloading a software version at a mobile terminal side, and the method may include the following steps.

In S201, a formatting indication is received, and a partition corresponding to an mth partition to be downloaded of a software version to be sent of the electronic equipment in the mobile terminal is formatted according to the indication, the software version to be sent including n partitions to be downloaded, n≥m≥1.

It is noted that the mapping partition corresponding to the mth partition to be downloaded in the embodiment of the disclosure is in the mobile terminal.

Specifically, the formatting indication may be a partition formatting instruction, the mobile terminal receives the partition formatting instruction sent by the electronic equipment, the partition formatting instruction being configured to indicate the mapping partition corresponding to the mth partition to be downloaded in the n partitions to be downloaded of the software version to be sent of the electronic equipment in the mobile terminal to be formatted, and the mobile terminal formats the mapping partition corresponding to the mth partition to be downloaded according to the partition formatting instruction, n≥m≥1.

In the embodiment of the disclosure, when the software version is downloaded, the mobile terminal may receive the partition formatting instruction sent by the electronic equipment at first, the partition formatting instruction indicating the mobile terminal to format the mapping partition corresponding to the mth partition to be downloaded at first, wherein the mth partition to be downloaded is a partition to be downloaded, determined by the electronic equipment, in the electronic equipment, the mapping partition corresponding to the mth partition to be downloaded is a partition corresponding to the mth partition to be downloaded in the mobile terminal, and the mobile terminal formats the mapping partition corresponding to the mth partition to be downloaded according to the partition formatting instruction.

It is noted that the mobile terminal may be mobile electronic equipment with an operating system, such as an intelligent mobile phone and a tablet computer.

Specifically, a software version downloading process in the embodiment of the disclosure is implemented by a downloading agent in the mobile terminal. The mobile terminal completes downloading of data of the n partitions to be downloaded and stores it in mapping partitions of the n partitions to be downloaded.

Formatting refers to an operation of initializing a disk or a partition in the disk, and such an operation may usually make all file data in the existing disk or partition cleared.

In the embodiment of the disclosure, the mobile terminal clears away a file in the mapping partition corresponding to the mth partition to be downloaded according to the formatting instruction.

It is noted that there is data in the n partitions to be downloaded of the original software version in the mobile terminal. When the new software version is updated or downloaded, the electronic equipment indicates the mobile terminal to clear away the data and then download new data.

In S202, when formatting of the mapping partition corresponding to the mth partition to be downloaded is completed and succeeds, an all-0 data packet is received and a writing operation is not performed on the all-0 data packet, or a non-0 data packet is received and the non-0 data packet is written into the mapping partition corresponding to the mth partition to be downloaded.

Optionally, a formatting returning instruction may include two types, i.e. success and failure. When the formatting returning instruction is success, it is represented that formatting in the mobile terminal is completed. When the formatting returning instruction is failure, it is represented that formatting in the mobile terminal is not completed.

It is noted that formatting processing of the mobile terminal over the mapping partition corresponding to the mth partition to be downloaded may succeed and may also fail. Therefore, the formatting returning instruction sent by the mobile terminal may include contents of success and failure to indicate that formatting of the mobile terminal over the mapping partition corresponding to the mth partition to be downloaded is completed or not completed.

Specifically, after the mobile terminal formats the mapping partition corresponding to the mth partition to be downloaded according to the partition formatting instruction, the mobile terminal sends the formatting returning instruction corresponding to the partition formatting instruction to the electronic equipment, the formatting returning instruction being configured to indicate whether formatting of the mapping partition corresponding to the mth partition to be downloaded is completed or not. When the partition formatting instruction is success, the mobile terminal receives the all-0 data packet or non-0 data packet sent by the electronic equipment.

It is noted that the electronic equipment may determine and send the data packet of the mth partition to be downloaded to the mobile terminal when receiving the formatting returning instruction of success from the mobile terminal, that is, the mobile terminal receives the data packet sent by the electronic equipment.

Particularly, the data packet received by the mobile terminal may be an all-0 data packet, and may also be a non-0 data packet. The mobile terminal may perform different processing on the all-0 data packet and the non-0 data packet.

Specifically, when receiving the all-0 data packet sent by the electronic equipment, the mobile terminal does not perform the writing operation on the all-0 data packet in the mapping partition corresponding to the mth partition to be downloaded. That is, the mobile terminal does not process the all-0 data packet sent by the electronic equipment, and does not write it into the mapping partition corresponding to the mth partition to be downloaded. When receiving the non-0 data packet, the mobile terminal writes the non-0 data packet into the mapping partition corresponding to the mth partition to be downloaded.

It is noted that, when the device for downloading a software version provided by the embodiment of the disclosure is not arranged in the mobile terminal, the mobile terminal receives the data packet sent by the electronic equipment through the device for downloading a software version.

In an embodiment, after completing transmission of data packets of the n partitions to be downloaded, the electronic equipment may send a downloading completion instruction to the mobile terminal. The downloading agent in the mobile terminal may be restarted after completing the writing operation in the mapping partition of an nth partition to be downloaded. After the mobile terminal is restarted, the new software version is validated.

According to the method for downloading a software version provided by the embodiment of the disclosure, the electronic equipment determines the ti partitions to be downloaded of the software version to be sent at first, n=1; then, the mobile terminal is indicated to format the mapping partition corresponding to the mth partition to be downloaded in the n partitions to be downloaded in the mobile terminal, n≥m≥1; and when it is determined that formatting of the mapping partition corresponding to the mth partition to be downloaded is completed and succeeds, the data of the mth partition to be downloaded is packed into the all-0 data packet or the non-0 data packet, and the all-0 data packet or the non-0 data packet is sent. By adopting the technical implementation solution of the embodiment of the disclosure, on one hand, the electronic equipment may send the data in the partitions to be downloaded of the software version to the mobile terminal in form of all-0 data packets or non-0 data packets, and then the mobile terminal may perform the writing operation on the non-0 data packets only, so that a writing operation time in a software version downloading process is reduced. On the other hand, the electronic equipment packs data blocks in the partitions to be downloaded for sending, so that the number of data interactions between the electronic equipment and the mobile terminal is reduced, and an interaction speed of them is increased. Thus it can be seen that the electronic equipment enables the mobile terminal to reduce the writing operation time and data interaction speed in the software version downloading process to farther increase a downloading rate of the software version.

On the basis of the abovementioned methods, the embodiment of the disclosure further provides a storage medium, which includes a set of instructions, the instructions being executed to cause at least one processor to execute the operations of the abovementioned methods.

Embodiment 2

The embodiment of the disclosure provides a method for downloading a software version, which is described with arrangement of a device for downloading a software version in electronic equipment and a mobile terminal as example. Therefore, instruction and data interactions in the embodiment of the disclosure are all interactions between the electronic equipment and the mobile terminal. As shown in FIG. 3, the method may include the following steps.

In S301, the electronic equipment sends a protocol handshake instruction to the mobile terminal, the protocol handshake instruction including a downloading protocol used by the electronic equipment.

In the embodiment of the disclosure, the electronic equipment may be connected with the mobile terminal through a data line, and a software version is stored in the electronic equipment.

It is noted that the software version in the embodiment of the disclosure provides software of an operating system of a latest version for the mobile terminal, and the mobile terminal may download and install the new software version to upgrade its own operating system.

Optionally, the software version may be Android 5.0, IOS7 and the like.

Herein, the software version includes multiple disk partitions, the disk partitions store data related to the operating system, the data is stored in a byte form, 1-byte data is stored at each address in the disk partitions, and there may usually be tens of to more than thirty disk partitions in a software version, for example: a boot partition and a system partition.

Downloading of the software version between the electronic equipment and the mobile terminal is downloading of each partition.

At first, the electronic equipment is required to confirm the downloading protocol with the mobile terminal to judge whether both the electronic equipment and the mobile terminal use the same downloading protocol or not. The electronic equipment and the mobile terminal may communicate with each other only when they use the same downloading protocol.

Optionally, a common downloading protocol may be: an HTTP, an FTP and the like.

Specifically, the electronic equipment sends the protocol handshake instruction to the mobile terminal, the protocol handshake instruction including the downloading protocol used by the electronic equipment.

It is noted that a tool for managing downloading of the software version in the electronic equipment is a downloading tool, and downloading of the software version between the electronic equipment and the mobile terminal is specifically controlled by a downloading program in the downloading tool. A software version downloading process in the embodiment of the disclosure is implemented by a downloading agent in the mobile terminal. The mobile terminal completes downloading of data of n partitions to be downloaded and stores it in mapping partitions of the n partitions to be downloaded.

Optionally, the electronic equipment in the embodiment of the disclosure may be electronic equipment configured to research and develop a new software version, such as a computer.

Optionally, the mobile terminal may be mobile electronic equipment with an operating system, such as an intelligent mobile phone and a tablet computer. In an embodiment, the protocol handshake instruction further includes an instruction identifier. In the embodiment of the disclosure, the instruction identifier of the protocol handshake instruction may be "0x01". All instructions in the embodiment of the disclosure include instruction identifiers, so that the electronic equipment or the mobile terminal may learn about types of the received instructions according to the instruction identifiers. Specific settings of the instruction identifiers may be designed by a researcher, which will not be limited in the disclosure.

Exemplarily, the downloading protocol in the protocol handshake instruction in the computer is "Hello Fast Download V 1.0".

In S302, the mobile terminal sends a protocol returning instruction to the electronic equipment, the protocol returning instruction including a downloading protocol used by the mobile terminal.

After the electronic equipment sends the protocol handshake instruction to the mobile terminal, the mobile terminal sends the protocol returning instruction to the electronic equipment, the protocol returning instruction including the downloading protocol used by the mobile terminal.

Specifically, the electronic equipment receives the protocol returning instruction sent by the mobile terminal, the protocol returning instruction including the downloading protocol used by the mobile terminal. If the downloading protocols of the two are consistent, the electronic equipment is prepared for downloading, and the electronic equipment starts determining the partitions to be downloaded.

In an embodiment, the instruction identifier of the protocol returning instruction in the embodiment of the disclosure may be "0x02".

Exemplarily, the downloading protocol in the protocol handshake instruction in the intelligent mobile phone is "Hello Fast Download V 1.0".

In S303, when the downloading protocol of the electronic equipment is consistent with the downloading protocol of the mobile terminal, the electronic equipment determines n partitions to be downloaded of a software version to be sent, n≥1.

After the mobile terminal sends the protocol returning instruction to the electronic equipment, when the downloading protocol of the electronic equipment is consistent with the downloading protocol of the mobile terminal, the electronic equipment determines the n partitions to be downloaded of the software version to be sent, the n partitions to be downloaded being non-0 partitions and n≥1.

Optionally, the software version includes a preset partition table file.

Specifically, when the downloading protocol of the electronic equipment is consistent with the downloading protocol of the mobile terminal, the electronic equipment may determine the n partitions to be downloaded in the software version to be sent according to the partition table file in the software version, the n partitions to be downloaded being non-0 partitions and n≥1, that is, data in the n partitions to be downloaded is required to be sent into the mobile terminal by the electronic equipment, and the partition table file includes information representing whether a partition is an all-0 partition or not.

It is noted that there also exist all-0 partitions without data, besides non-0 partitions such as the boot partition and the system partition, in the software version. The mobile terminal is not required to download these all-0 partitions and the mobile terminal is only required to create these all-0 partitions in the mobile terminal according to the partition table file provided by the software version after a mobile phone completes downloading of the non-0 partitions and is restarted.

Exemplarily, if n=3, the downloading protocol in the computer is "Hello Fast Download V 1.0", and the downloading protocol in the intelligent mobile phone is "Hello Fast Download V 1.0", the downloading protocols of the computer and the intelligent mobile phone are consistent, and the computer determines 3 non-0 partitions to be downloaded according to information of a partition table file in Android 5.0: a boot partition, a system partition and a user partition.

In S304, the electronic equipment sends a partition formatting instruction to the mobile terminal, the partition formatting instruction being configured to indicate the mobile terminal to format a mapping partition corresponding to an mth partition to be downloaded in the n partitions to be downloaded in the mobile terminal, n≥m≥1.

When the downloading protocol of the electronic equipment is consistent with the downloading protocol of the mobile terminal, after the electronic equipment determines the n partitions to be downloaded of the software version to be sent, the electronic equipment sends the partition formatting instruction to the mobile terminal, the partition formatting instruction being configured to indicate the mobile terminal to format the mapping partition corresponding to the mth partition to be downloaded in the n partitions to be downloaded in the mobile terminal, n≥m≥1.

It is noted that, before the mobile terminal starts downloading, there are mapping partitions corresponding to the n partitions to be downloaded in an original software version of the mobile terminal. Therefore, the electronic equipment downloads data in the n partitions to be downloaded in the new software version into the mapping partitions corresponding to the n partitions to be downloaded in the mobile terminal to update data of the mapping partitions of the n partitions to be downloaded.

Particularly, there is at least one partition to be downloaded of the software version. The mobile terminal sequentially downloads each partition to be downloaded, and during downloading. The mobile terminal is required to format the mapping partition of each partition to be downloaded and then starts receiving the data. Accordingly, the partition formatting instruction indicates different partitions to be formatted according to different partitions to be downloaded. In addition, a sequence of the partitions to be downloaded may be determined by the partition table file, data transmission may also be performed according to a preset sequence, and a specific data transmission sequence for the partitions to be downloaded may be determined by a practical setting, and will not be limited in the disclosure.

In an embodiment, the instruction identifier of the partition formatting instruction in the embodiment of the disclosure may be "0x03". The partition formatting instruction further includes: a starting address and ending address for partition formatting, and the starting address and ending address for partition formatting are configured to indicate the mobile terminal to format the data from the starting address to the ending address.

Exemplarily, if n=3, the computer determines the 3 partitions to be downloaded: the boot partition, the system partition and the user partition. If m=1, the computer may cause the intelligent mobile phone to download a mapping partition of the boot partition at first according to the partition table file of Android 5.0, and then the computer sends a partition formatting instruction at first to indicate the intelligent mobile phone to format the mapping partition of the boot partition. The intelligent mobile phone may download a mapping partition of the system partition after completing downloading of the mapping partition of the boot partition, and at this moment, m=2, the computer resends a partition formatting instruction to indicate the intelligent mobile phone to format the mapping partition of the system partition.

In S305, the mobile terminal formats the mapping partition corresponding to the mth partition to be downloaded according to the partition formatting instruction.

After the electronic equipment sends the partition formatting instruction to the mobile terminal, the mobile terminal formats the mapping partition corresponding to the mth partition to be downloaded according to the partition formatting instruction.

Formatting refers to an operation of initializing a disk or a partition in the disk, and such an operation may usually make all file data in the existing disk or partition cleared.

Specifically, in the embodiment of the disclosure, the mobile terminal formats data blocks from the starting address to the ending address in the mapping partition corresponding to the mth partition to be downloaded to be 0 according to the starting address and ending address in the formatting instruction.

It is noted that there is data in the n partitions to be downloaded of the original software version in the mobile terminal. When the new software version is updated or downloaded, the electronic equipment indicates the mobile terminal to clear away the data and then download new data, i.e. upgrading of the software version.

Exemplarily, m=1, the computer may cause the intelligent mobile phone to download the mapping partition of the boot partition according to the partition table file of Android 5.0, the computer sends a starting address 0 and ending address 50 in the partition formatting instruction to indicate the intelligent mobile phone to format data blocks of the addresses 0-50 in the mapping partition of the boot partition, and the intelligent mobile phone formats the data blocks of the addresses 0-50 in the mapping partition of the boot partition to be 0.

In S306, the mobile terminal sends a formatting returning instruction corresponding to the partition formatting instruction to the electronic equipment, the formatting returning instruction being configured to indicate whether formatting of the mapping partition corresponding to the mth partition to be downloaded is completed or not.

After the mobile terminal formats the mapping partition corresponding to the mth partition to be downloaded according to the partition formatting instruction, the mobile terminal sends the formatting returning instruction corresponding to the partition formatting instruction, the formatting returning instruction being configured to indicate whether formatting of the mapping partition corresponding to the mth partition to be downloaded is completed or not.

Optionally, the formatting returning instruction may include two types, i.e. success and failure. When the formatting returning instruction is success, it is represented that formatting in the mobile terminal is completed; and when the formatting returning instruction is failure, it is represented that formatting in the mobile terminal is not completed.

It is noted that formatting processing of the mobile terminal over the mapping partition corresponding to the mth partition to be downloaded may succeed and may also fail. Therefore, the formatting returning instruction sent by the mobile terminal may include contents of success and failure to indicate that formatting of the mobile terminal over the mapping partition corresponding to the mth partition to be downloaded is completed or not completed.

In an embodiment, the instruction identifier of the formatting returning instruction in the embodiment of the disclosure may be "0x04", and the formatting returning instruction further includes the starting addresses and ending addresses of the data blocks formatted by the mobile terminal and information about whether formatting of the mobile terminal succeeds or fails.

In S307, when the formatting returning instruction is success, the electronic equipment reads a first data block with a preset address length from the mth partition to be downloaded.

It is noted that those skilled in the art should know that data in the partitions to be downloaded of the software version may include massive all-0 data capable of forming an all-0 data region. In the embodiment of the disclosure, the electronic equipment may determine the all-0 data in the partitions to be downloaded and further determine the all-0 data region through a reading operation. The electronic equipment determines the all-0 data or non-all-0 data of the partitions to be downloaded, and packs it into an all-0 data packet or a non-all-0 data packet.

After the mobile terminal sends the formatting returning instruction corresponding to the partition formatting instruction to the electronic equipment, when the formatting returning instruction is success, the electronic equipment reads the first data block with the preset address length from the mth partition to be downloaded.

It is noted that, when the formatting returning instruction is success, downloading of the software version between the electronic equipment and the mobile terminal is started, and specifically, the mth partition to be downloaded is downloaded.

In the embodiment of the disclosure, the electronic equipment performs the data reading operation in form of data blocks when starting downloading the mth partition to be downloaded. This is because there may be continuous all-0 data blocks in the partitions to be downloaded and the electronic equipment is required to distinguish the all-0 data blocks from non-0 data blocks and pack them into data packets respectively. Therefore, the reading operation of the electronic equipment in the mth partition to be downloaded is performed according to the preset address length.

Optionally, the preset address length may be set by a researcher according to a practical condition, which will not be specifically limited in the disclosure.

In an embodiment, when the formatting returning instruction is failure, the electronic equipment re-indicates the mobile terminal to format the mth partition to be downloaded until it is successfully formatted.

In S308, the electronic equipment judges whether the first data block is an all-0 data block or not.

After the electronic equipment reads the first data block with the preset address length from the mth partition to be downloaded, the electronic equipment judges whether all data of the first data block is 0 or not.

Specifically, the electronic equipment sequentially reads the data of the first data block, and judges whether all the data in the first data block is 0 or not.

It is noted that the method for downloading a software version provided by the embodiment of the disclosure is a process where the downloading tool in the electronic equipment sends the corresponding data in the software version to the downloading agent in the mobile terminal to enable the mobile terminal to download the software version. After determining a data packet of a partition to be downloaded, the electronic equipment sends the data packet to the mobile terminal.

In S309, when the first data block is a non-0 data block, the electronic equipment packs the first data block into a non-0 data packet, and sends the non-0 data packet to the mobile terminal, wherein the non-0 data packet includes a checksum.

After the electronic equipment judges whether the first data block is an all-0 data block or not, when the first data block is a non-0 data block, the electronic equipment packs the first data block into a non-0 data packet, and sends the non-0 data packet to the mobile terminal.

It is noted that the checksum is configured for the mobile terminal to judge whether the data is correctly received or not after the data of the mth partition to be downloaded is received.

In an embodiment, packet header information obtained by packing the first data block by the electronic equipment includes a starting address and ending address of the first data block and a non-0 marker. For example, the marker is "0x06". The mobile terminal may learn about that the data packet includes the non-0 first data block and address information of the non-0 data block through the packet header information after receiving the non-0 data packet, and may obtain the data of the first data block after opening the non-0 data packet.

In S310, when the first data block is an all-0 data block, the electronic equipment reads a next data block with the preset address length and when the next data block is an all-0 data block, continues reading subsequent data blocks until a non-0 data block is read, packs the first data block and the at least one second data block into an all-0 data packet, and sends the all-0 data packet to the mobile terminal.

It is noted that packet header information obtained by packing the first data block and the at least one second data block by the electronic equipment includes a starting address and ending address from the first data block to the at least one second data block and an all-0 marker. For example, the marker is "0x05", After receiving the all-0 data packet, the mobile terminal may learn about that the data packet includes all-0 data blocks and also obtain address information of the all-0 data block through the packet header information.

It can be understood that the electronic equipment packs continuous all-0 data blocks into a data packet for sending to the mobile terminal, so that the number of interactions between the electronic equipment and the mobile terminal is reduced.

In an embodiment, the electronic equipment repeats the operations of S308-S310 to perform the reading operation on the data of the mth partition to be downloaded.

It is noted that S309 and S310 are two optional steps after S308, and after S308, S309 may be executed and S310 may also be executed. A specific execution sequence is determined by a type of a data block practically read by the electronic equipment, and will not be limited in the disclosure.

In S311, the electronic equipment judges whether there is unpacked and unsent data in the mth partition to be downloaded or not.

After the electronic equipment sends the data packet to the mobile terminal, the electronic equipment judges whether there is unpacked and unsent data in the mth partition to be downloaded or not, that is, it is judged whether the electronic equipment has sent all the data of the mth partition to be downloaded to the mobile terminal and completed downloading of the mth partition to be downloaded at an electronic equipment side or not.

In S312, when the unpacked and unsent data exists, the electronic equipment returns to execute S308 to S311.

After the electronic equipment judges whether the unpacked and unsent data exists in the mth partition to be downloaded or not, existence of the unpacked and unsent data represents that the data of the mth partition to be downloaded has yet not been completely sent. Therefore, the electronic equipment returns to execute S308 to S311 to continue sending the data of the mth partition to be downloaded.

In S313, when the unpacked and unsent data does not exist, the electronic equipment waits for a downloading returning instruction of the mobile terminal, the downloading returning instruction being configured to indicate a downloading state of data of the mapping partition corresponding to the mth partition to be downloaded and the downloading state including: successful downloading or failed downloading.

After the electronic equipment judges whether the unpacked and unsent data exists in the mth partition to be downloaded or not, nonexistence of the unpacked and unsent data represents that the electronic equipment completes sending of the data of the mth partition to be downloaded. Therefore, the electronic equipment waits for feedback information from a mobile terminal side, i.e. the downloading returning instruction, to judge whether the mobile terminal has correctly received the sent data or not.

In an embodiment, an instruction type of the downloading returning instruction in the embodiment of the disclosure is "0x07", and the downloading returning instruction includes: downloading state information of successful downloading or failed downloading, and further includes a starting address and ending address of the data in the mth partition to be downloaded.

It is noted that S312 and S313 are two optional steps after S311, and after S311, S312 may be executed and S313 may also be executed. A specific execution sequence is determined by practically judging whether sending of the data in the mth partition to be downloaded is completed or not by the electronic equipment, and will not be limited in the disclosure.

In S314, the mobile terminal receives the all-0 data packet, and does not perform a writing operation on the all-0 data packet.

Optionally, the data packet includes packet header information, and the packet header information includes the all-0 marker.

Specifically, after the electronic equipment sends the all-0 data packet to the mobile terminal, when determining that the data packet is an all-0 data packet according to the all-0 marker of the packet header information of the received data packet and according to the packet header information of the data packet, the mobile terminal does not perform the writing operation on the all-0 data packet in the mapping partition corresponding to the mth partition to be downloaded.

It can be understood that the mobile terminal does not perform the writing operation on the all-0 data packet, so that time for the writing operation on all-0 data is saved.

In S315, the mobile terminal receives the non-U data packet, and writes the non-0 data packet into the mapping partition corresponding to the mth partition to be downloaded.

Optionally, the data packet includes packet header information, and the packet header information includes the non-0 marker.

Specifically, after the electronic equipment sends the non-0 data packet to the mobile terminal, when determining that the data packet is a non-0 data packet according to the non-0 marker of the packet header information of the received data packet, the mobile terminal performs the writing operation on the non-0 data packet in the mapping partition corresponding to the mth partition to be downloaded.

It is noted that S314 is a step following S309, and S315 is a step following S310.

In S316, the mobile terminal judges whether downloading of data of the mapping partition corresponding to the mth partition to be downloaded is completed or not.

Specifically, after the mobile terminal does not perform the writing operation on the all-0 data packet or performs the writing operation on the non-0 data packet, the mobile terminal judges whether downloading of the data of the mapping partition corresponding to the mth partition to be downloaded is completed or not.

In an embodiment, the operation that the mobile terminal judges whether downloading of the data of the mapping partition corresponding to the mth partition to be downloaded is completed or not is a conventional art, and will not be elaborated in the embodiment of the disclosure.

In S317, when downloading is not completed, the mobile terminal waits to receive the data packet sent by the electronic equipment.

After the mobile terminal judges whether downloading of the data of the mapping partition corresponding to the mth partition to be downloaded is completed or not, when downloading is not completed, the mobile terminal waits to receive the rest data packet sent by the electronic equipment.

In S318, when downloading is completed, the mobile terminal calculates a current checksum of the mapping partition corresponding to the mth partition to be downloaded, and compares it with the checksum in the non-0 data packet.

After the mobile terminal judges whether downloading of the data of the mapping partition corresponding to the mth partition to be downloaded is completed or not, when downloading is completed, the mobile terminal calculates the current checksum of the mapping partition corresponding to the mth partition to be downloaded, and compares it with the checksum in the non-0 data packet to judge whether the mapping partition corresponding to the mth partition to be downloaded is correctly downloaded or not.

Particularly, the current checksum is a checksum of data received by the mobile terminal, and the checksum in the non-0 data packet is a correct checksum.

Specifically, the mobile terminal calculates the current checksum of the received data packet according to partition information of the mapping partition corresponding to the mth partition to be downloaded in the preset partition table file and the received non-0 data packet.

It is noted that S317 and S318 are two optional steps after S316, and after S316, S317 may be executed and S318 may also be executed. A specific execution sequence is determined by a practical condition, and will not be limited in the disclosure.

It is noted that S311-S313 and S314-S318 are parallel steps after S309 or S310, and their execution order will not be limited in the disclosure.

In S319, when the current checksum is consistent with the checksum in the non-0 data packet, the mobile terminal sends a downloading returning instruction representing successful downloading of the mapping partition corresponding to the mth partition to be downloaded to the electronic equipment.

When downloading is completed, after the mobile terminal calculates the current checksum of the mapping partition corresponding to the mth partition to be downloaded and compares it with the checksum in the non-0 data packet, when the current checksum is consistent with the checksum in the non-0 data packet, the mobile terminal sends the downloading returning instruction representing successful downloading of the mapping partition corresponding to the mth partition to be downloaded to the electronic equipment.

It is noted that: in a data transmission process, various unexpected conditions may influence data transmission, such as data loss or damage, so that the mobile terminal is required to judge whether the non-0 data packet is correctly received or not when receiving the non-0 data packet. Specifically, if the current checksum is consistent with the checksum in the non-0 data packet, it is represented that the non-0 data packet received by the mobile terminal is correct. At this moment, the mobile terminal sends the downloading returning instruction representing successful downloading of the mapping partition corresponding to the mth partition to be downloaded to the electronic equipment, the downloading returning instruction including successful downloading and failed downloading. In an embodiment, the instruction identifier of the downloading returning instruction in the embodiment of the disclosure may be "0x07", and the downloading returning instruction further includes a starting address and ending address of successfully downloaded data of the mapping partition corresponding to the mth partition to be downloaded.

In S320, when the current checksum is inconsistent with the checksum in the non-0 data packet, the mobile terminal sends a downloading returning instruction representing failed downloading of the mth partition to be downloaded to the electronic equipment.

When downloading is completed, after the mobile terminal calculates the current checksum of the mapping partition corresponding to the mth partition to be downloaded and compares it with the checksum in the non-0 data packet, when the current checksum is inconsistent with the checksum in the non-0 data packet, the mobile terminal sends the downloading returning instruction representing failed downloading of the mapping partition corresponding to the mth partition to be downloaded to the electronic equipment.

It is noted that: in the data transmission process, various unexpected conditions may influence data transmission, such as data loss or damage, so that the mobile terminal is required to judge whether the non-0 data packet is correctly received or not when receiving the non-0 data packet. Specifically, if the current checksum is inconsistent with the checksum in the non-0 data packet, it is represented that the non-0 data packet received by the mobile terminal is incorrect. At this moment, the mobile terminal sends the downloading returning instruction representing failed downloading of the mapping partition corresponding to the mth partition to be downloaded to the electronic equipment.

In an embodiment, the instruction identifier of the downloading returning instruction in the embodiment of the disclosure may be "0x07", and the downloading returning instruction further includes a starting address and ending address of data, which is failed to be downloaded, of the mapping partition corresponding to the mth partition to be downloaded.

It is noted that S319 and S320 are two optional steps after S318, and after S318, S319 may be executed and S320 may also be executed. A specific execution sequence is determined by a comparison result between the current checksum and the checksum in the non-0 data packet, and will not be limited in the disclosure.

It is noted that S319 and S320 are two optional steps after S313, and after S313, S319 may be executed and S320 may also be executed. A specific execution sequence is determined by the comparison result between the current checksum and the checksum in the non-0 data packet, and will not be limited in the disclosure.

In S321, when m≠n, the electronic equipment downloads an (m+1)th partition to be downloaded.

When the current checksum is consistent with the checksum in the non-0 data packet, after the mobile terminal sends the downloading returning instruction representing successful downloading of the mapping partition corresponding to the mth partition to be downloaded to the electronic equipment, when m≠n, the electronic equipment is prepared to download the (m+1)th partition to be downloaded.

It is noted that the current checksum is consistent with the checksum in the non-0 data packet, downloading of the data of the mth partition to be downloaded is completed and then the electronic equipment starts downloading of the (m+1)th partition to be downloaded after the electronic equipment receives the downloading returning instruction of successful downloading.

In S322, when m=n, the electronic equipment sends a downloading completion instruction to the mobile terminal to end downloading, the downloading completion instruction being configured to indicate that software version downloading to the mobile terminal is completed.

When the current checksum is consistent with the checksum in the non-0 data packet, after the mobile terminal sends the downloading returning instruction representing successful downloading of the mapping partition corresponding to the mth partition to be downloaded to the electronic equipment, when m=n, the electronic equipment sends the downloading completion instruction to the mobile terminal to end downloading, the downloading completion instruction being configured to indicate that software version downloading to the mobile terminal is completed.

In an embodiment, the instruction identifier of the downloading completion instruction in the embodiment of the disclosure may be "0x08".

Specifically, when m=n, it is indicated that all of the n partitions to be downloaded of the software version have been completely downloaded, so that the electronic equipment sends the downloading completion instruction indicating that software version downloading is completed to the mobile terminal.

It is noted that S321 and S322 are two optional steps after S319. After S319, S321 may be executed and S322 may also be executed. A specific execution sequence is determined by a condition, and will not be limited in the disclosure.

In an embodiment, after the electronic equipment completes transmission of the data packets of the n partitions to be downloaded and sends the downloading completion instruction to the mobile terminal, the downloading agent in the mobile terminal may be restarted after the writing operation over the mapping partition of the nth partition to be downloaded is completed, and after the mobile terminal is restarted, the new software version is validated.

In S323, the electronic equipment re-downloads the mth partition to be downloaded.

When the current checksum is inconsistent with the checksum in the non-0 data packet, the mobile terminal sends the downloading returning instruction representing failed downloading of the mth partition to be downloaded to the electronic equipment.

It is noted that the current checksum is inconsistent with the checksum in the non-0 data packet, downloading of the data in the mth partition to be downloaded is not completed and then the electronic equipment is required to repeat downloading of the mth partition to be downloaded after receiving the downloading returning instruction representing failed downloading, that is, S303-S321 are repeated.

The embodiment of the disclosure provides the method for downloading a software version. The electronic equipment determines the n partitions to be downloaded of the software version to be sent at first, n≥1; then, the mobile terminal is indicated to format the mapping partition corresponding to the mth partition to be downloaded in the n partitions to be downloaded in the mobile terminal, n≥m≥1; and when it is determined that formatting of the mapping partition corresponding to the mth partition to be downloaded is completed and succeeds, the data of the mth partition to be downloaded is packed into the all-0 data packet or the non-0 data packet, and the all-0 data packet or the non-0 data packet is sent. By adopting the technical solution of the embodiment of the disclosure, on one hand, the electronic equipment may send the data in the partitions to be downloaded of the software version to the mobile terminal in form of all-0 data packets or non-0 data packets, and then the mobile terminal may perform the writing operation on the non-0 data packets only, so that a writing operation time in a software version downloading process is reduced. On the other hand, the electronic equipment packs data blocks in the partitions to be downloaded for sending, so that the number of data interactions between the electronic equipment and the mobile terminal is reduced, and an interaction speed of the two is increased. Thus it can be seen that the electronic equipment enables the mobile terminal to reduce the writing operation time and data interaction speed in the software version downloading process to further increase a downloading rate of the software version.

On the basis of the abovementioned method, the embodiment of the disclosure further provides a storage medium, which includes a set of instructions, the instructions being executed to cause at least one processor to execute the operations of the abovementioned method.

Embodiment 3

Figure 4:
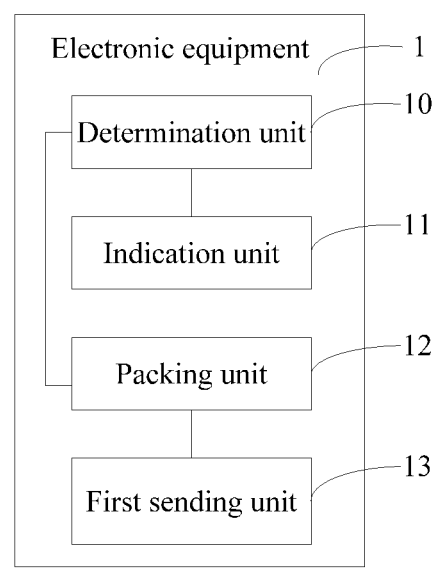
FIG. 4 is a first structure diagram of a device 1 for downloading a software version according to an embodiment of the disclosure.

As shown in FIG. 4, the embodiment of the disclosure provides a device for downloading a software version 1, which corresponds to a method for downloading a software version for an electronic equipment side. The device for downloading a software version 1 includes:

a determination unit 10, configured to determine n partitions to be downloaded of a software version to be sent, n≥1;

an indication unit 11, configured to indicate a mobile terminal to format a mapping partition corresponding to an mth partition to be downloaded in the n partitions to be downloaded determined by the determination unit 10 in the mobile terminal, n≥m≥1;

a packing unit 12, configured to, when the determination unit 10 determines that formatting of the mapping partition corresponding to the mth partition to be downloaded is completed and succeeds, pack data of the mth partition to be downloaded determined by the determination unit 10 into an all-0 data packet or a non-0 data packet; and a first sending unit 13, configured to send the all-0 data packet or non-0 data packet packed by the packing unit 12.

Figure 5:
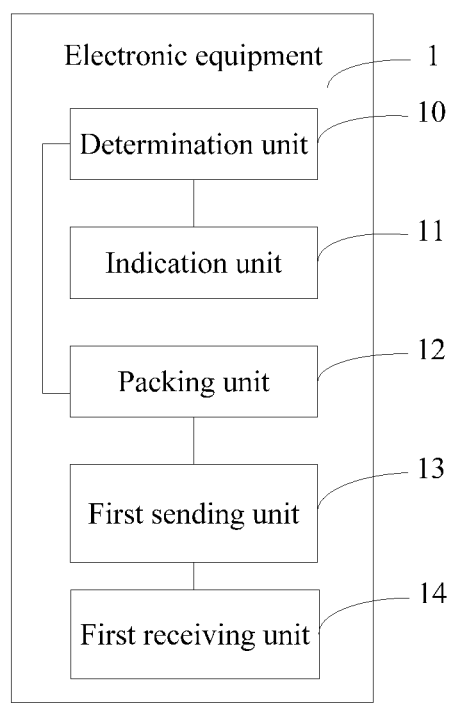
FIG. 5 is a second structure diagram of a device 1 for downloading a software version according to an embodiment of the disclosure.

Optionally, as shown in FIG. 5, the device for downloading a software version 1 further includes a first receiving unit.

The first sending unit 13 is further configured to send a partition formatting instruction, the partition formatting instruction being configured to indicate the mobile terminal to format the mapping partition corresponding to the mth partition to be downloaded in the n partitions to be downloaded determined by the determination unit 10 in the mobile terminal.

The first receiving unit 14 is configured to receive a formatting returning instruction corresponding to the partition formatting instruction sent by the first sending unit 13, the formatting returning instruction being configured to indicate whether the mobile terminal completes formatting of the mapping partition corresponding to the mth partition to be downloaded or not.

Figure 6:
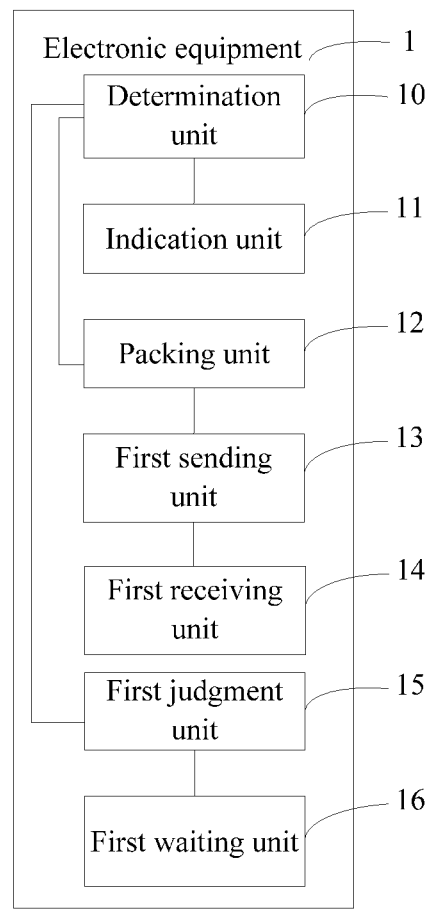
FIG. 6 is a third structure diagram of a device 1 for downloading a software version according to an embodiment of the disclosure.

Optionally, as shown in FIG. 6, the device for downloading a software version 1 further includes a first judgment unit 15 and a first waiting unit 16.

The first judgment unit 15 is configured to, after the first sending unit 13 sends the all-0 data packet or the non-0 data packet, judge whether there is unpacked and unsent data in the mth partition to be downloaded determined by the determination unit 10 or not.

The first waiting unit 16 is configured to, when the first judgment unit 15 judges that there is no unpacked and unsent data, wait for a downloading returning instruction of the mobile terminal, the downloading returning instruction being configured to indicate a downloading state of data in the mapping partition corresponding to the mth partition to be downloaded.

Figure 7:
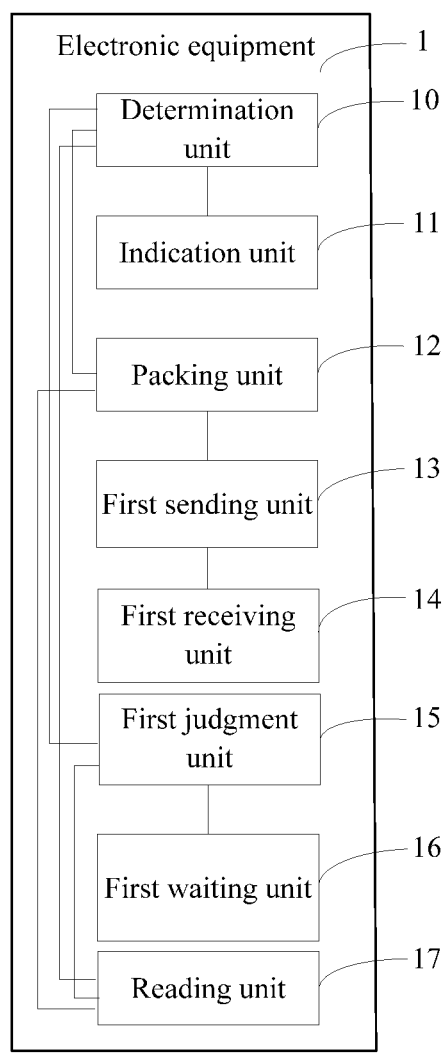
FIG. 7 is a fourth structure diagram of a device 1 for downloading a software version according to an embodiment of the disclosure.

Optionally, as shown in FIG. 7, the device for downloading a software version 1 further includes a reading unit 17.

The reading unit 17 is configured to, when the determination unit 10 determines that formatting of the mapping partition corresponding to the mth partition to be downloaded is completed and succeeds, read a first data block with a preset address length from the With partition to be downloaded determined by the determination unit 10, or, when the first judgment unit 15 judges that there is unpacked and unsent data, read the first data block with the preset address length from the mth partition to be downloaded determined by the determination unit 10.

The first judgment unit 15 is further configured to judge whether the first data block read by the reading unit 17 is an all-0 data block or not.

The packing unit 12 is specifically configured to, when the first judgment unit 15 judges that the first data block is a non-0 data block, pack the first data block read by the reading unit 17 into a non-0 data packet; and the first sending unit 13 is specifically configured to send the non-0 data packet packed by the packing unit 12.

The reading unit 17 is further specifically configured to, when the first judgment unit 15 judges that the first data block is an all-0 data block, continue reading at least one second data block with the preset address length until a non-0 data block is read. The packing unit 12 is further specifically configured to pack the first data block and at least one second data block read by the reading unit 17 into an all-0 data packet. The first sending unit 13 is further specifically configured to send the all-0 data packet packed by the packing unit 12.

Optionally, the downloading state includes successful downloading or failed downloading.

The first receiving unit 14 is further configured to, when the first judgment unit 15 judges that there is no unpacked and unsent data, after the first waiting unit 16 waits for the downloading returning instruction of the mobile terminal, receive the downloading returning instruction.

The first sending unit 13 is further configured to, when the downloading returning instruction received by the first receiving unit 14 indicates that the downloading state is successful downloading and m≠n, send a next partition formatting instruction, the next partition formatting instruction being configured to indicate the mobile terminal to format a mapping partition corresponding to an (m+1)th partition to be downloaded in the mobile terminal. The first sending unit 13 is further configured to, when the downloading returning instruction received by the first receiving unit 14 indicates that the downloading state is failed downloading, resend the partition formatting instruction.

Optionally, when m=n, the first sending unit 13 is further configured to, after the first receiving unit 14 receives the downloading returning instruction, send a downloading completion instruction to end downloading, the downloading completion instruction being configured to indicate that software version downloading of the mobile terminal is completed.

The device for downloading a software version in the embodiment of the disclosure may be a downloading tool arranged in electronic equipment, and may also be an independent device connected with the electronic equipment and capable of communicating with a software downloading device at a mobile terminal side.

It is noted that the first receiving unit in the embodiment of the disclosure may be implemented by a receiver, the first sending unit may be implemented by a sender, the first judgment unit, the first waiting unit, the determination unit, the indication unit, the packing unit and the reading unit may be implemented by a processor, and the sender, receiver and processor will specifically be described in subsequent embodiments in detail.

The embodiment of the disclosure provides the device for downloading a software version, which may be arranged in the electronic equipment. The device for downloading a software version 1 determines the n partitions to be downloaded of the software version to be sent at first, n≥1; then, the mobile terminal is indicated to format the mapping partition corresponding to the mth partition to be downloaded in the n partitions to be downloaded in the mobile terminal, n≥m≥1; and when it is determined that formatting of the mapping partition corresponding to the mth partition to be downloaded is completed and succeeds, the data of the mth partition to be downloaded is packed into the all-0 data packet or the non-0 data packet, and the all-0 data packet or the non-0 data packet is sent. By adopting the technical implementation solution of the embodiment of the disclosure, on one hand, the device for downloading a software version 1 sends the data in the partitions to be downloaded of the software version to the mobile terminal in form of all-0 data packets or non-0 data packets, and then the mobile terminal may perform the writing operation on the non-0 data packets only, so that a writing operation time in a software version downloading process is reduced. On the other hand, the device for downloading a software version 1 packs data blocks in the partitions to be downloaded for sending, so that the number of data interactions between the device for downloading a software version 1 and the mobile terminal is reduced, and an interaction speed of the two is increased. Thus it can be seen that the device for downloading a software version 1 enables the mobile terminal to reduce the writing operation time and data interaction speed in the software version downloading process to further increase a downloading rate of the software version.

Figure 8:
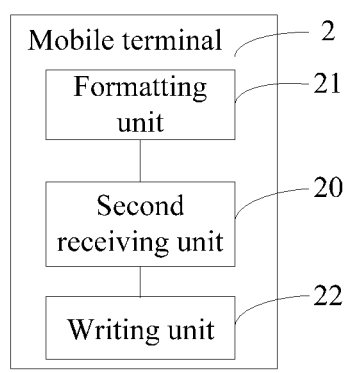
FIG. 8 is a first structure diagram of a device 2 for downloading a software version according to an embodiment of the disclosure.

As shown in FIG. 8, the embodiment of the disclosure provides a device for downloading a software version 2, which corresponds to a method for downloading a software version for a mobile terminal side. The device for downloading a software version 2 includes:

a second receiving unit 20, configured to receive a formatting indication;

a formatting unit 21, configured to format a mapping partition corresponding to an mth partition to be downloaded of a software version to be sent of electronic equipment in a mobile terminal according to the indication received by the second receiving unit 20, the software version to be sent including n partitions to be downloaded, $n \geq m \geq 1$;

the second receiving unit 20 being further configured to, when formatting of the formatting unit 21 over the mapping partition corresponding to the mth partition to be downloaded is completed and succeeds, receive an all-0 data packet or a non-0 data packet; and a writing unit 22, configured to not perform a writing operation on the all-0 data packet received by the second receiving unit 20, or write the non-0 data packet received by the second receiving unit 20 into the mapping partition corresponding to the mth partition to be downloaded.

Figure 9:
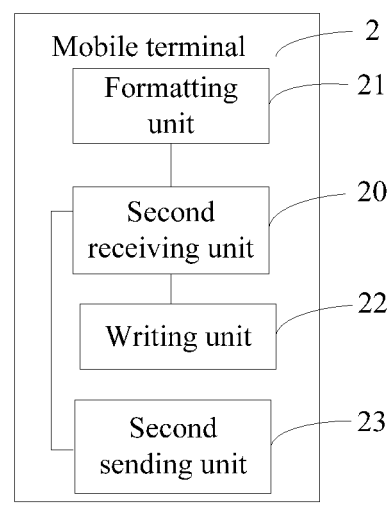
FIG. 9 is a second structure diagram of a device 2 for downloading a software version according to an embodiment of the disclosure.

Optionally, as shown in FIG. 9, the indication received by the second receiving unit 20 is a partition formatting instruction; and the device for downloading a software version 2 further includes a second sending unit 23.

The second sending unit 23 is configured to send a formatting returning instruction corresponding to the partition formatting instruction received by the second receiving unit 20, the formatting returning instruction being configured to indicate whether formatting of the mapping partition corresponding to the mth partition to be downloaded is completed or not.

Figure 10:
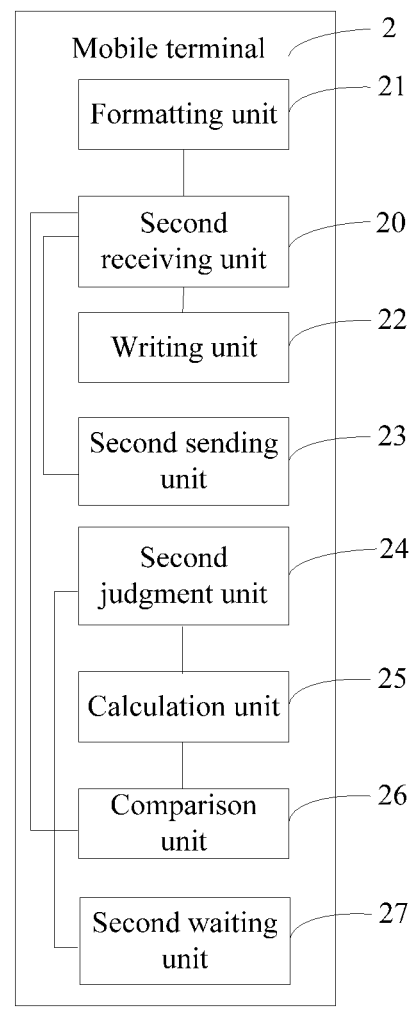
FIG. 10 is a third structure diagram of a device 2 for downloading a software version according to an embodiment of the disclosure.

Optionally, as shown in FIG. 10, the non-0 data packet received by the second receiving unit 20 includes a checksum; and the device for downloading a software version 2 further includes a second judgment unit 24, a calculation unit 25, a comparison unit 26 and a second waiting unit 27.

The second judgment unit 24 is configured to, after the second receiving unit 20 receives the non-0 data packet and the writing unit 22 writes the non-0 data packet received by the second receiving unit 20 into the mapping partition corresponding to the mat partition to be downloaded, judge whether downloading of data of the mapping partition corresponding to the mth partition to be downloaded is completed or not.

The calculation unit 25 is configured to, when the second judgment unit 24 judges that downloading is completed, calculate a current checksum of the mapping partition corresponding to the mth partition to be downloaded. The comparison unit 26 is configured to compare the current checksum calculated by the calculation unit 25 with the checksum in the non-0 data packet received by the second receiving unit 20.

The second waiting unit 27 is configured to, when the second judgment unit 24 judges that downloading is not completed, wait to receive the data packet.

Optionally, the second sending unit 23 is further configured to, after the calculation unit 25 calculates the current checksum of the mapping partition corresponding to the mth partition to be downloaded and the comparison unit 26 compares it with the checksum in the non-0 data packet received by the second receiving unit 20, when the current checksum calculated by the calculation unit 26 is consistent with the checksum in the non-0 data packet, send a downloading returning instruction representing successful downloading of the mapping partition corresponding to the mth partition to be downloaded, and when the current checksum calculated by the calculation unit 25 is inconsistent with the checksum in the non-0 data packet received by the second receiving unit 20, send a downloading returning instruction representing failed downloading of the mth partition to be downloaded.

Optionally, when m=n, the second receiving unit 20 is further configured to, after the second sending unit 23 sends the downloading returning instruction representing successful downloading of the mapping partition corresponding to the mth partition to be downloaded, receive a downloading completion instruction to end downloading, the downloading completion instruction being configured to indicate that software version downloading is completed.

The device for downloading a software version in the embodiment of the disclosure may be a downloading agent arranged in the mobile terminal, and may also be an independent device connected with the mobile terminal and capable of communicating with a software downloading device at an electronic equipment side.

It is noted that the second receiving unit in the embodiment of the disclosure may be implemented by a receiver, the first sending unit may be implemented by a sender, the second judgment unit, the second waiting unit, the calculation unit, the formatting unit, the comparison unit and the writing unit may be implemented by a processor, and the sender, receiver and processor will specifically be described in the subsequent embodiment in detail.

The embodiment of the disclosure provides the device for downloading a software version 2, which may be arranged in the mobile terminal. The device for downloading a software version 2 receives the formatting indication, and formats the mapping partition corresponding to the mth partition to be downloaded of the software version to be sent by the electronic equipment in the mobile terminal according to the indication, the software version to be sent including the n partitions to be downloaded, $n \geq m \geq 1$; and then, when formatting of the mapping partition corresponding to the mth partition to be downloaded is completed and succeeds, the all-0 data packet or the non-0 data packet is received, the writing operation is not performed on the all-0 data packet, or the non-0 data packet is written into the mapping partition corresponding to the mth partition to be downloaded. By adopting the technical solution of the embodiment of the disclosure, on one hand, the electronic equipment may send the data in the partitions to be downloaded of the software version to the device for downloading a software version 2 in form of all-0 data packets or non-0 data packets, and then the device for downloading a software version 2 may perform the writing operation on the non-0 data packets only, so that a writing operation time in a software version downloading process is reduced. On the other hand, the electronic equipment packs data blocks in the partitions to be downloaded for sending, so that the number of data interactions between the electronic equipment and the device for downloading a software version 2 is reduced, and an interaction speed of the two is increased. Thus it can be seen that the device for downloading a software version 2 reduces the writing operation time and data interaction speed in the software version downloading process to further increase a downloading rate of the software version.

Embodiment 4

Figure 11:
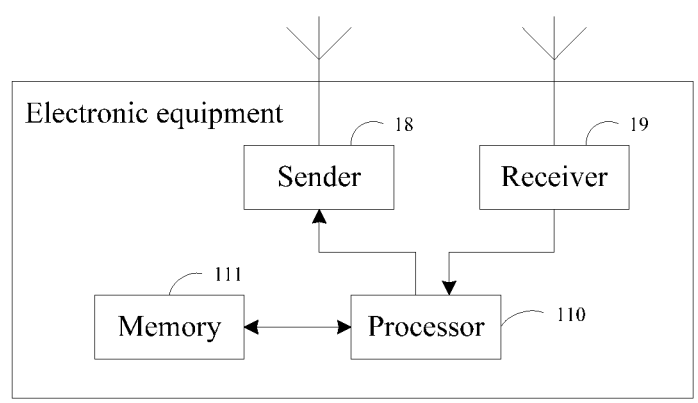
FIG. 11 is a fifth structure diagram of a device 1 for downloading a software version according to an embodiment of the disclosure.

As shown in FIG. 11, the embodiment of the disclosure provides electronic equipment, which corresponds to a method for downloading a software version for an electronic equipment side. The electronic equipment includes:
a sender 18, a receiver 19, a processor 110 and a memory 111, wherein the sender 18, the receiver 19 and the memory 111 are all connected with the processor 110. For example, the sender 18, the receiver 19 and the memory 111 may all be connected with the processor 110 through a bus.

The receiver 19 and the sender 18 may be integrated to form a transceiver.

The memory 111 is configured to store executable program codes, the program codes include computer operating instructions, and the memory 111 may include a high-speed Random Access Memory (RAM), and may also include a non-volatile memory, for example, at least one disk memory.

The processor 110 may be a central processing unit, a specific integrated circuit, or one or more integrated circuits configured to implement the disclosure.

Specifically, the processor 110 may be configured to determine n partitions to be downloaded of a software version to be sent, n≥1, indicate a mobile terminal to format a mapping partition corresponding to an mth partition to be downloaded in the n partitions to be downloaded in the mobile terminal, n≥m≥1, and when it is determined that formatting of the mapping partition corresponding to the mth partition to be downloaded is completed and succeeds, pack data of the mth partition to be downloaded into an all-0 data packet or a non-0 data packet. The sender 18 is configured to send the all-0 data packet or non-0 data packet packed by the processor 110. The receiver 19 may be configured to receive an instruction sent by the mobile terminal. The memory 111 may be configured to store data of the n partitions to be downloaded, software codes thereof and a software program controlling the electronic equipment to implement the abovementioned process, thereby enabling the processor 110 to execute the software program and call the software codes to implement the abovementioned process.

Optionally, the sender 18 is further configured to send a partition formatting instruction, the partition formatting instruction being configured to indicate the mobile terminal to format the mapping partition corresponding to the mth partition to be downloaded in the n partitions to be downloaded in the mobile terminal.

The receiver 19 is further configured to receive a formatting returning instruction corresponding to the partition formatting instruction sent by the sender 18, the formatting returning instruction being configured to indicate whether the mobile terminal completes formatting of the mapping partition corresponding to the mth partition to be downloaded or not.

Optionally, the processor 110 is further configured to, after the sender 18 sends the all-0 data packet or the non-0 data packet to the mobile terminal, judge whether there is unpacked and unsent data in the mth partition to be downloaded or not.

The processor 110 is further configured to, when there is no unpacked and unsent data, wait for a downloading returning instruction of the mobile terminal, the downloading returning instruction being configured to indicate a downloading state of data in the mapping partition corresponding to the mth partition to be downloaded.

Optionally, the processor 110 is specifically configured to, when formatting of the mapping partition corresponding to the mth partition to be downloaded is completed and succeeds, read a first data block with a preset address length from the mth partition to be downloaded, or, when there is unpacked and unsent data, read the first data block with the preset address length from the mth partition to be downloaded.

The processor 110 is further configured to judge whether the first data block read by the reading unit is an all-0 data block or not.

The processor 110 is further specifically configured to, when the first data block is a non-0 data block, pack the first data block into a non-0 data packet.

The sender 18 is specifically configured to send the non-0 data packet packed by the processor 110 to the mobile terminal.

The processor 110 is further specifically configured to, when the first data block is an all-0 data block, continue reading at least one second data block with the preset address length until a non-0 data block is read, and pack the first data block and the at least one second data block into an all-0 data packet, and the sender 18 is further specifically configured to send the all-0 data packet packed by the processor 110 to the mobile terminal.

In the solution, the downloading state includes successful downloading or failed downloading.

The receiver 19 is farther configured to, when the processor 110 judges that there is no the unpacked and unsent data, after the processor 110 waits for the downloading returning instruction of the mobile terminal, receive the downloading returning instruction sent by the mobile terminal.

The sender 18 is further configured to, when the downloading returning instruction received by the receiver 19 indicates that the downloading state is successful downloading and m≠n, send a next partition formatting instruction to the mobile terminal, the next partition formatting instruction being configured to indicate the mobile terminal to format a mapping partition corresponding to an (m+1)th partition to be downloaded in the mobile terminal.

The sender 18 is further configured to, when the downloading returning instruction received by the receiver 19 indicates that the downloading state is failed downloading, resend the partition formatting instruction to the mobile terminal.

Optionally, when m=n, the sender 18 is further configured to, after the receiver 19 receives the downloading returning instruction sent by the mobile terminal, send a downloading completion instruction to the mobile terminal to end downloading, the downloading completion instruction being configured to indicate that software version downloading of the mobile terminal is completed.

The electronic equipment in the embodiment of the disclosure may be electronic equipment configured to research and develop a new software version, such as a computer, and the device for downloading a software version is arranged in the electronic equipment.

The embodiment of the disclosure provides the electronic equipment. The electronic equipment determines the n partitions to be downloaded of the software version to be sent at first, n≥1; then, the mobile terminal is indicated to format the mapping partition corresponding to the mth partition to be downloaded in the n partitions to be downloaded in the mobile terminal, n≥m≥1; and when it is determined that formatting of the mapping partition corresponding to the mth partition to be downloaded is completed and succeeds, the data of the mth partition to be downloaded is packed into the all-0 data packet or the non-0 data packet, and the all-0 data packet or the non-0 data packet is sent. By adopting the technical solution of the embodiment of the disclosure, on one hand, the electronic equipment sends the data in the partitions to be downloaded of the software version to the mobile terminal in form of all-0 data packets or non-0 data packets, and then the mobile terminal may perform the writing operation on the non-0 data packets only, so that a writing operation time in a software version downloading process is reduced. On the other hand, the electronic equipment packs data blocks in the partitions to be downloaded for sending, so that the number of data interactions between the electronic equipment and the mobile terminal is reduced, and an interaction speed of the two is increased. Thus it can be seen that the electronic equipment enables the mobile terminal to reduce the writing operation time and data interaction speed in the software version downloading process to further increase a downloading rate of the software version.

Figure 12:
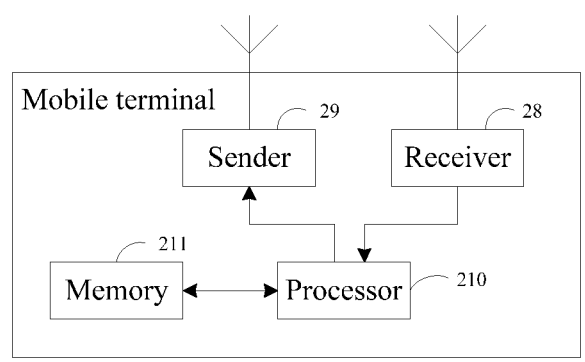
FIG. 12 is a fourth structure diagram of a device 2 for downloading a software version according to an embodiment of the disclosure.

As shown in FIG. 12, the embodiment of the disclosure provides a mobile terminal, which includes:

a receiver 28, a sender 29, a processor 210 and a memory 211, wherein the sender 29, the receiver 28 and the memory 211 are all connected with the processor 210. For example, the sender 29, the receiver 28 and the memory 211 may all be connected with the processor 210 through a bus.

The receiver 28 and the sender 29 may be integrated to form a transceiver.

The memory 211 is configured to store executable program codes, the program codes includes computer operating instructions, and the memory 211 may include a high-speed RAM, and may also include a non-volatile memory, for example, at least one disk memory.

The processor 210 may be a central processing unit, a specific integrated circuit, or one or more integrated circuits configured to implement the disclosure.

Specifically, the receiver 28 may be configured to receive a formatting indication. The processor 210 may be configured to format a mapping partition corresponding to an mth partition to be downloaded of a software version to be sent of electronic equipment in a mobile terminal according to the indication received by the receiver 28, the software version to be sent including n partitions to be downloaded, n≥m≥1. The receiver 28 may further be configured to, when formatting of the processor 210 over the mapping partition corresponding to the mth partition to be downloaded is completed and succeeds, receive an all-0 data packet or a non-0 data packet. The processor 210 is further configured to not perform a writing operation on the all-0 data packet received by the receiver 28, or write the non-0 data packet received by the receiver 28 into the mapping partition corresponding to the mth partition to be downloaded. The sender 29 may be configured to receive instructions and data sent by the electronic equipment. The memory 211 may be configured to store data of the n partitions to be downloaded, software codes thereof and a software program controlling the mobile terminal to implement the abovementioned process, thereby enabling the processor 210 to execute the software program and call the software codes to implement the abovementioned process.

Optionally, the indication received by the receiver 28 is a partition formatting instruction; and the sender 29 is configured to send a formatting returning instruction corresponding to the partition formatting instruction received by the receiver 28, the formatting returning instruction being configured to indicate whether formatting of the mapping partition corresponding to the mth partition to be downloaded is completed or not.

Optionally, the non-0 data packet received by the receiver 28 includes a checksum.

The processor 210 is further configured to, after the receiver 28 receives the non-0 data packet and the non-0 data packet received by the receiver 28 is written into the mapping partition corresponding to the mth partition to be downloaded, judge whether downloading of data of the mapping partition corresponding to the mth partition to be downloaded is completed or not.

The processor 210 is further configured to, when downloading is completed, calculate a current checksum of the mapping partition corresponding to the mth partition to be downloaded and compare the current checksum with the checksum in the non-0 data packet received by the receiver 28, and when downloading is not completed, wait to receive the data packet sent by the electronic equipment.

Optionally, the sender 29 is further configured to, after the processor 210 calculates the current checksum of the mapping partition corresponding to the mth partition to be downloaded and the processor 210 compares it with the checksum in the non-0 data packet received by the receiver 28, when the current checksum calculated by the processor 210 is consistent with the checksum in the non-0 data packet, send a downloading returning instruction representing successful downloading of the mapping partition corresponding to the mth partition to be downloaded to the electronic equipment, and when the current checksum calculated by the processor 210 is inconsistent with the checksum in the non-0 data packet, send a downloading returning instruction representing failed downloading of the mth partition to be downloaded to the electronic equipment.

Optionally, when m=n, the receiver 28 is further configured to, after the sender 29 sends the downloading returning instruction configured to represent successful downloading of the mapping partition corresponding to the mth partition to be downloaded to the electronic equipment, receive a downloading completion instruction sent by the electronic equipment to end downloading, the downloading completion instruction being configured to indicate that software version downloading is completed.

Optionally, the mobile terminal may be mobile electronic equipment with an operating system, such as an intelligent mobile phone and a tablet computer, and a device for downloading a software version is arranged in the mobile electronic equipment.

The embodiment of the disclosure provides the mobile terminal. The mobile terminal receives the formatting indication, and formats the mapping partition corresponding to the mth partition to be downloaded of the software version to be sent of the electronic equipment in the mobile terminal according to the indication, the software version to be sent including the n partitions to be downloaded, n≥m≥1; and then, when formatting of the mapping partition corresponding to the mth partition to be downloaded is completed and succeeds, the all-0 data packet or the non-0 data packet is received, the writing operation is not performed on the all-0 data packet, or the non-0 data packet is written into the mapping partition corresponding to the mth partition to be downloaded. By adopting the technical solution of the embodiment of the disclosure, on one hand, the electronic equipment may send the data in the partitions to be downloaded of the software version to the mobile terminal in form of all-0 data packets or non-0 data packets, and then the mobile terminal may perform the writing operation on the non-0 data packets only, so that a writing operation time in a software version downloading process is reduced. On the other hand, the electronic equipment packs data blocks in the partitions to be downloaded for sending, so that the number of data interactions between the electronic equipment and the mobile terminal is reduced, and an interaction speed of the two is increased. Thus it can be seen that the mobile terminal reduces the writing operation time and data interaction speed in the software version downloading process to further increase a downloading rate of the software version.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, device (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of protection of the disclosure.

INDUSTRIAL APPLICABILITY

According to the embodiments of the disclosure, the electronic equipment determines the n partitions to be downloaded of the software version to be sent at first, n≥1; then, the mobile terminal is indicated to format the mapping partition corresponding to the mth partition to be downloaded in the n partitions to be downloaded in the mobile terminal, n≥m≥1; and when it is determined that formatting of the mapping partition corresponding to the mth partition to be downloaded is completed and succeeds, the data of the mth partition to be downloaded is packed into the all-0 data packet or the non-0 data packet, and the all-0 data packet or the non-0 data packet is sent. Thus it can be seen that the electronic equipment enables the mobile terminal to reduce the writing operation time and data interaction speed in the software version downloading process to further increase a downloading rate of the software version.

The invention claimed is:

1. A method for downloading a software version, comprising:
   determining, by electronic equipment, n partitions to be downloaded of a software version to be sent, n≥1;
   indicating, by the electronic equipment, a mobile terminal to format a mapping partition corresponding to an mth partition to be downloaded in the n partitions to be downloaded in the mobile terminal, n≥m≥1;
   receiving, by the mobile terminal, a formatting indication from the electronic equipment, and formatting the mapping partition corresponding to the mth partition to be downloaded of the software version from the electronic equipment in the mobile terminal according to the formatting indication, wherein formatting comprises clearing all data in an existing partition of the mobile terminal;
   determining that formatting of the mapping partition corresponding to the mth partition to be downloaded is completed and succeeds;
   in response to determining that the formatting is completed and succeeds, reading, by the electronic equipment, a first data block with a preset address length from the mth partition to be downloaded, and judging whether the first data block of the mth partition to be downloaded is an all-0 data block or not;
   in response to judging, packing, by the electronic equipment, data of the mth partition to be downloaded into an all-0 data packet or a non-0 data packet, and sending the all-0 data packet or the non-0 data packet;
   receiving, by the mobile terminal, the all-0 data packet and not performing a writing operation on the all-0 data packet, or receiving the non-0 data packet and writing the non-0 data packet into the mapping partition corresponding to the mth partition to be downloaded; and
   in response to determining that m=n, sending, by the electronic equipment, a downloading completion instruction to the mobile terminal.

2. The method according to claim 1, wherein packing the data of the mth partition to be downloaded into the all-0 data packet or the non-0 data packet and sending the all-0 data packet or the non-0 data packet comprises:

when the first data block is a non-0 data block, packing the first data block into a non-0 data packet, and sending the non-0 data packet; and when the first data block is an all-0 data block, reading, by the electronic equipment, a next data block with the preset address length and when the next data block is an all-0 data block, continuing reading subsequent data blocks until a non-0 data block is read, packing the first data block and the next data block and the subsequent data blocks when each of the first data block, the next data block, and the subsequent data blocks are all-0 data blocks into an all-0 data packet, and sending the all-0 data packet to the mobile terminal.

3. The method according to claim 2, after sending the all-0 data packet or the non-0 data packet, the method further comprising:

when there is no unpacked and unsent data, waiting for a downloading returning instruction from the mobile terminal, the downloading returning instruction being configured to indicate a downloading state of data of the mapping partition corresponding to the mth partition to be downloaded.

4. The method according to claim 3, wherein the downloading state comprises: successful downloading or failed downloading;

after waiting for the downloading returning instruction from the mobile terminal when there is no unpacked and unsent data, the method further comprises:

receiving, by the electronic equipment, the downloading returning instruction;

when the downloading returning instruction indicates that the downloading state is successful downloading and m≠n, downloading an (m+1)th partition to be downloaded; and when the downloading returning instruction indicates that the downloading state is failed downloading, re-downloading the mth partition to be downloaded.

5. The method according to claim 4, wherein sending, by the electronic equipment, the downloading completion instruction comprises sending the downloading completion instruction after receiving the downloading returning instruction sent by the mobile terminal to end downloading, the downloading completion instruction being configured to indicate that software version downloading of the mobile terminal is completed.

6. The method according to claim 1, wherein indicating the mobile terminal to format the mapping partition corresponding to the mth partition to be downloaded in the n partitions to be downloaded in the mobile terminal comprises:

sending, by the electronic equipment, a partition formatting instruction, the partition formatting instruction being configured to indicate the mobile terminal to format the mapping partition corresponding to the mth partition to be downloaded in the n partitions to be downloaded in the mobile terminal; and receiving, by the electronic equipment, a formatting returning instruction corresponding to the partition formatting instruction, the formatting returning instruction being configured to indicate whether the mobile terminal completes formatting of the mapping partition corresponding to the mth partition to be downloaded or not.

7. The method according to claim 1, wherein the formatting indication is a partition formatting instruction; and after formatting the mapping partition corresponding to the mth partition to be downloaded, the method further comprises:

sending, by the mobile terminal, a formatting returning instruction corresponding to the partition formatting instruction.

8. The method according to claim 1, wherein the non-0 data packet comprises a checksum;

after receiving the non-0 data packet and writing the non-0 data packet in the mapping partition corresponding to the mth partition to be downloaded, the method further comprises:

judging, by the mobile terminal, whether downloading of data of the mapping partition corresponding to the mth partition to be downloaded is completed or not;

when downloading is completed, calculating, by the mobile terminal, a current checksum of the mapping partition corresponding to the mth partition to be downloaded, and comparing the current checksum with the checksum in the non-0 data packet; and when downloading is not completed, waiting to receive data packet.

9. The method according to claim 8, after calculating the current checksum of the mapping partition corresponding to the mth partition to be downloaded and comparing the current checksum with the checksum in the non-0 data packet, the method further comprising:

when the current checksum is consistent with the checksum in the non-0 data packet, sending, by the mobile terminal, a downloading returning instruction representing successful downloading of the mapping partition corresponding to the mth partition to be downloaded; and when the current checksum is inconsistent with the checksum in the non-0 data packet, sending, by the mobile terminal, a downloading returning instruction representing failed downloading of the mth partition to be downloaded.

10. A device for downloading a software version, comprising:

a processor; and a memory configured to store instructions executable by the processor, wherein the processor is configured to execute the instructions to:

determine n partitions to be downloaded of a software version to be sent, n≥1;

indicate a mobile terminal to format a mapping partition corresponding to an mth partition to be downloaded in the n partitions to be downloaded in the mobile terminal, n≥m≥1, wherein the indication to format the mapping partition causes the mobile terminal to format the mapping partition by clearing all data in an existing partition of the mobile terminal;

determine that formatting of the mapping partition corresponding to the mth partition to be downloaded is completed and succeeds, in response to determining that the formatting is completed and succeeds, read a first data block with a preset address length from the mth partition to be downloaded, and judge whether the first data block of the mth partition is an all-0 data block or not;

in response to judging, pack data of the mth partition to be downloaded into an all-0 data packet or a non-0 data packet;

send the all-0 data packet or non-0 data packet, to enable the mobile terminal to write the non-0 data packet into the mapping partition corresponding to the mth partition to be downloaded or not to perform a writing operation on the all-0 data packet when formatting of the mapping partition corresponding to the mth partition to be downloaded is completed and succeeds; and in response to determining that m=n, send a downloading completion instruction to the mobile terminal.

11. The device according to claim 10, wherein the processor is configured to execute the instructions to:

send a partition formatting instruction, the partition formatting instruction being configured to indicate the mobile terminal to format the mapping partition, in the mobile terminal, corresponding to the mth partition to be downloaded in the n partitions to be downloaded; and receive a formatting returning instruction corresponding to the partition formatting instruction, the formatting returning instruction being configured to indicate whether the mobile terminal completes formatting of the mapping partition corresponding to the mth partition to be downloaded or not.

12. The device according to claim 10, wherein the processor is configured to execute the instructions to:

when there is no unpacked and unsent data, wait for a downloading returning instruction from the mobile terminal, the downloading returning instruction being configured to indicate a downloading state of data of the mapping partition corresponding to the mth partition to be downloaded.

13. The device according to claim 12, wherein the processor is configured to execute the instructions to:

when the first data block is a non-0 data block, pack the first data block into a non-0 data packet and send the non-0 data packet; and when the first data block is an all-0 data block, read a next data block with the preset address length and when the next data block is an all-0 data block, continue reading subsequent data blocks until a non-0 data block is read, pack the first data block and the next data block and the subsequent data blocks when each of the first data block, the next data block, and the subsequent data blocks are all-0 data blocks into an all-0 data packet, and send the all-0 data packet to the mobile terminal.

14. The device according to claim 12, wherein the downloading state comprises: successful downloading or failed downloading;

wherein the processor is configured to execute the instructions to, when there is no unpacked and unsent data, after waiting for the downloading returning instruction from the mobile terminal, receive the downloading returning instruction;

when the downloading returning instruction indicates that the downloading state is successful downloading and m≠n, send a next partition formatting instruction, the next partition formatting instruction being configured to indicate the mobile terminal to format a mapping partition corresponding to an (m+1)th partition to be downloaded in the mobile terminal; and when the downloading returning instruction indicates that the downloading state is failed downloading, resend a partition formatting instruction.

15. The device according to claim 14, wherein the downloading completion instruction is configured to indicate that software version downloading of the mobile terminal is completed.

16. A device for downloading a software version, comprising:

a processor; and a memory configured to store instructions executable by the processor, wherein the processor is configured to execute the instructions to:

receive a formatting indication from electronic equipment;

format a mapping partition corresponding to an mth partition to be downloaded of a software version to be sent by the electronic equipment in a mobile terminal according to the formatting indication, the software version to be sent comprising n partitions to be downloaded, n≥m≥1, wherein formatting comprises clearing all data in an existing partition of the mobile terminal;

when formatting of the mapping partition corresponding to the mth partition to be downloaded is completed and succeeds, receive an all-0 data packet or a non-0 data packet packed and sent by the electronic equipment in response to the electronic equipment judging whether a first data block of the mth partition is an all-0 data block or not;

not perform a writing operation on the all-0 data packet, or write the non-0 data packet into the mapping partition corresponding to the mth partition to be downloaded; and in response to m=n, receive a downloading completion instruction from the electronic equipment.

17. The device according to claim 16, wherein the formatting indication is a partition formatting instruction; and wherein the processor is configured to execute the instructions to:

after the mapping partition corresponding to the mth partition to be downloaded is formatted, send a formatting returning instruction corresponding to the partition formatting instruction, the formatting returning instruction being configured to indicate whether formatting of the mapping partition corresponding to the mth partition to be downloaded is completed or not.

18. The device according to claim 16, wherein the non-0 data packet comprises a checksum and the processor is configured to execute the instructions to:

after the non-0 data packet is received and the non-0 data packet is written into the mapping partition corresponding to the mth partition to be downloaded, judge whether downloading of data of the mapping partition corresponding to the mth partition to be downloaded is completed or not;

when it is judged that downloading is completed, calculate a current checksum of the mapping partition corresponding to the mth partition to be downloaded and compare the current checksum with the checksum in the non-0 data packet; and when it is judged that downloading is not completed, wait to receive data packet.

19. The device according to claim 18, wherein the processor is configured to execute the instructions to:

after the current checksum of the mapping partition corresponding to the mth partition to be downloaded is calculated and compared with the checksum in the non-0 data packet, when the current checksum is consistent with the checksum in the non-0 data packet, send a downloading returning instruction representing successful downloading of the mapping partition corresponding to the mth partition to be downloaded, and when the current checksum is inconsistent with the checksum in the non-0 data packet, send a downloading returning instruction representing failed downloading of the mth partition to be downloaded.

\* \* \* \* \*